United States Patent
Bertero et al.

(10) Patent No.: US 6,698,013 B1
(45) Date of Patent: Feb. 24, 2004

(54) REAL TIME MONITORING SYSTEM FOR TRACKING AND DOCUMENTING CHANGES MADE BY PROGRAMMER'S DURING MAINTENANCE OR DEVELOPMENT OF COMPUTER READABLE CODE ON A LINE BY LINE BASIS AND/OR BY POINT OF FOCUS

(75) Inventors: Anthony R. Bertero, El Monte, CA (US); Milton D. Rosenberg, Venice, CA (US)

(73) Assignee: Mintaka Technology Group, Los Angeles, CA (US)

( * ) Notice: Subject to any disclaimer, the term of this patent is extended or adjusted under 35 U.S.C. 154(b) by 553 days.

(21) Appl. No.: 09/679,132

(22) Filed: Oct. 4, 2000

(51) Int. Cl.⁷ ................................................. G06F 9/44
(52) U.S. Cl. ........................ 717/127; 717/101; 717/120
(58) Field of Search ................................ 717/122, 127, 717/120, 100, 101; 709/317; 706/16; 707/6

(56) References Cited

U.S. PATENT DOCUMENTS

| | | | | |
|---|---|---|---|---|
| 5,313,616 A | * | 5/1994 | Cline et al. | 717/127 |
| 5,812,780 A | * | 9/1998 | Chen et al. | 709/224 |
| 6,026,379 A | | 2/2000 | Haller et al. | 705/34 |
| 6,092,086 A | | 7/2000 | Martin et al. | 707/202 |
| 6,158,049 A | * | 12/2000 | Goodwin et al. | 717/158 |
| 6,269,474 B1 | * | 7/2001 | Price | 717/104 |
| 6,405,364 B1 | * | 6/2002 | Bowman-Amuah | 717/101 |
| 6,502,237 B1 | * | 12/2002 | Yates et al. | 717/136 |
| 6,519,571 B1 | * | 2/2003 | Guheen et al. | 705/14 |
| 2002/0083168 A1 | * | 6/2002 | Sweeney et al. | 709/224 |

OTHER PUBLICATIONS

"An Empirical Study Of COBOL Programmers", J.D. Gordon et al, Canadian Journal of Operational Research and Information Processing, vol 15, no 2, pp. 229–241, Jun. 1977.*

"How Debuggers Work", J.B. Rosenberg, Chapters 1–12 published 1996.*

"A Method to Evaluate The Programmer Response To Equivalent Programs", E. Georgiadou et al, published 1994.*

* cited by examiner

*Primary Examiner*—Todd Ingberg

(57) ABSTRACT

A method and system for documenting and tracking user interaction with computer readable code during modification or development of computer software is described. The invention provides a controlled environment for recording detailed information about user actions and events that occur during the maintenance and development of computer readable code. Features of the invention facilitate the entry of comments, review, and modification of the computer readable code. Embodiments of the invention, in real time, monitor, record, and report changes made to software modules at a line-by-line level. The nature and context of changes made to lines of code and any search requests are identified and recorded in one or more databases for review and reporting.

37 Claims, 16 Drawing Sheets

Microfiche Appendix Included
(1 Microfiche, 43 Pages)

```
Mintaka - [Editing (GoodCobol.txt)]
File  Edit  Insert  View  Tools  Reports  Go To  Window  Help 000001  *****************************************************************    *  SG1234
000002  *  NAME:       JOHN MINTAKA                                           *  MTG-025
000003  *  CLASS:      COBOL-1                                                *  SG1234
000004  *  PROJECT:    PROJECT #1                                             *  SG1234
000005  *  DUE DATE:   JULY 8, 1999                                           *  SG1234
000006  *  SUMMARY: THE OBJECT OF THIS PROGRAM IS TO READ A FILE OF           *  SG1234
000007  *  TRANSACTIONS AND PRODUCE AN INVENTORY REPORT. THIS WILL BE         *  SG1234
000008  *  DONE BY READING THE FILE FROM FILE1.DAT AND MOVING THE DATA        *  SG1234
000009  *  TO THE DESIGNATED OUTPUT FIELD AND THEN PRINT THE REPORT.          *  SG1234
000010  *  ALSO COUNTERS ARE USED TO ACCOUNT FOR:                             *  SG1234
000011  *   - THE PAGES, SO THE NEW PAGE NUMBER CAN BE PRINTED IN HEADER.     *  SG1234
000012  *   - THE NUMBER OF LINES USED, SO THE HEADINGS AND OUTPUT DATA       *  SG1234
000013  *  CAN BE PRINTED ON A NEW PAGE WHEN THE PAGE LIMIT IS EXCEEDED.      *  SG1234
000014  *   - THE TOTAL TRANSACTION READ AND TOTAL TRANSACTION WRITTEN.       *  SG1234
000015  *  FINALLY THIS PROGRAM DEMONSTRATES THE USE OF REDEFINE CLAUSE       *  SG1234
000016  *  MOVE CORRESPONDING STATEMENT, ACCEPTING THE SYSTEM DATE AND        *  SG1234
000017  *  ZERO SUPPRESSING OF OUTPUT DATA.                                   *  SG1234
000018  *****************************************************************    *  SG1234
000019                                                                           SG1234
000020   IDENTIFICATION DIVISION.                                                 SG1234
000021   PROGRAM-ID. PROJECT 1.                                                   SG1234
000022   AUTHOR. JACK MINTAKA.                                                    SG1234
000023   INSTALLATION. CLC.                                                       SG1234
000024   DATE WRITTEN. 6/30/99                                                    SG1234
000025   DATE COMPILED.                                                           SG1234
000026                                                                            SG1234
000027   ENVIRONMENT DIVISION.                                                    SG1234
000028   CONFIGURATION SECTION.                                                   SG1234
000029   SOURCE-COMPUTER. IBM-PC                                                  SG1234
000030   OBJECT-COMPUTER. IBM-PC                                                  SG1234
000031                                                                            SG1234
000032   INPUT-OUTPUT SECTION.                                                    SG1234
000033   FILE CONTROL.                                                            SG1234
000034      SELECT INVENTORY-FILE1 ASSIGN TO 'B:\FILE1.DAT'                       SG1234
000035      ORGANIZATION LINE SEQUENTIAL.                                         SG1234
```

FIG. 2B

| 1 | 2 | 3 | 4 | 5 | 6 | 7 |
|---|---|---|---|---|---|---|
| Module | Date | Time | Edit Action | Edit Attribute | Code Seq# | Activity Detail |
| EXAMPL02 | 04/05/00 | 09:45 | Find Whole Word | Down From | 000100 | CATS |
| . | 04/05/00 | 09:45 | Find Txt Found | At | 000100 | *CATS AND DOGS |
| . | 04/05/00 | 09:46 | Find & Replace | Text Before | 000100 | *CATS AND DOGS |
| . | 04/05/00 | 09:46 | Find & Replace | Text After | 000100 | *RATS AND DOGS |
| . | 04/05/00 | 09:46 | Find Whole Word | Down From | 000100 | CATS |
| . | 04/05/00 | 09:46 | Find Txt Found | At | 000900 | *CATS *BIRDS AND DRAGONS |
| . | 04/05/00 | 09:47 | Find & Replace All | Text Before | 000900 | *CATS *BIRDS AND DRAGONS |
| . | 04/05/00 | 09:47 | Find & Replace All | Text After | 000900 | *RATS *BIRDS AND DRAGONS |
| . | 04/05/00 | 09:47 | Find & Replace All | Text Before | 000910 | *CATS AND MOUSE |
| . | 04/05/00 | 09:47 | Find & Replace All | Text After | 000910 | *RATS AND MOUSE |
| . | 04/05/00 | 09:47 | Find & Replace All | Text Before | 000920 | *CATS AND HAT |
| . | 04/05/00 | 09:47 | Find & Replace All | Text After | 000920 | *RATS AND HAT |
| . | 04/05/00 | 09:47 | Find Txt Not Found | At | 001000 | |

FIG. 2F

| Mintaka Code Tracker | | | | | |
|---|---|---|---|---|---|
| File Edit Insert View Tools Reports Go To Window Help | | | | | |

| All Details | | Current Details | | Current Finds | |
|---|---|---|---|---|---|
| Modules | | Associated Details | | Work Activity | |

| Date | Activity | Project | Time Start | Time Finish | Activity Duration | Description of Work Activity |
|---|---|---|---|---|---|---|
| 05/19/00 | Edit | Single User | 10:00 | 10:00 | 0 | Edited some MRP Modules |
| 06/02/00 | Edit | MRP | 09:00 | 17:00 | 8 | Roman's Work Activity |
| 06/03/00 | Meeting | 08:45 | 17:00 | 17:00 | 8.25 | Roman's Work Activity |

FIG. 21

| Mintaka Code Tracker | | | | | | | |
|---|---|---|---|---|---|---|---|
| File Edit Insert View Tools Reports Go To Window Help | | | | | | | |

All Details / Current Details / Current Finds

Modules / Associated Details / Work Activity

| Date | Module | Time Start | Time Finish | Description of Activity | Application | Project |
|---|---|---|---|---|---|---|
| 06/01/00 | MMMMMMM | 09:00 | 17:00 | Product Code Update | MRP | Single User |
| 06/02/00 | Roman | 09:00 | 17:00 | Roman's Work Source Module | Roman's Application | MRP |
| 06/02/00 | Roman | 09:00 | 17:00 | Product Code Update | Roman's Application | MRP |
| 06/02/00 | Roman | 09:00 | 17:00 | Product Code Update | Roman's Application | MRP |
| 06/02/00 | Roman | 09:00 | 17:00 | Product Code Update | Roman's Application | MRP |
| 06/02/00 | Roman | 09:00 | 17:00 | Product Code Update | Roman's Application | MRP |
| 06/15/00 | Roman | 19:00 | 19:00 | Wilson Love Deburg | Roman's Application | MRP |
| 06/16/00 | MMMMMMM | 14:20 | 14:20 | \Development\Users\MTG-022\GoodCobol.txt | MRP | Single User |
| 06/16/00 | MMMMMMM | 17:55 | 17:55 | C:\Sergey\GC2.txt | MRP | Single User |
| 06/16/00 | MMMMMMM | 18:00 | 18:00 | C:\Sergey\GC3.txt | MRP | Single User |
| 06/16/00 | MMMMMMM | 18:01 | 18:01 | C:\Sergey\GC2.txt | MRP | Single User |
| 06/16/00 | MMMMMMM | 18:15 | 18:15 | C:\Sergey\GoodCobol.txt | MRP | Single User |
| 06/16/00 | MMMMMMM | 18:17 | 18:17 | C:\Sergey\GC2.txt | MRP | Single User |
| 06/16/00 | MMMMMMM | 18:18 | 18:18 | C:\Sergey\GoodCobol.txt | MRP | Single User |
| 06/19/00 | MMMMMMM | 16:22 | 16:22 | C:\Sergey\GC2.txt | MRP | Single User |
| 06/19/00 | MMMMMMM | 16:59 | 16:59 | C:\Sergey\GoodCobol.txt | MRP | Single User |
| 06/20/00 | MMMMMMM | 10:40 | 10:40 | C:\Sergey\GC2.txt | MRP | Single User |
| 06/20/00 | MMMMMMM | 10:52 | 10:52 | C:\Sergey\Goodcobol.txt | MRP | Single User |

FIG. 2J-1

REAL TIME MONITORING SYSTEM FOR TRACKING AND DOCUMENTING CHANGES MADE BY PROGRAMMER'S DURING MAINTENANCE OR DEVELOPMENT OF COMPUTER READABLE CODE ON A LINE BY LINE BASIS AND/OR BY POINT OF FOCUS

MICROFICHE REFERENCE

Microfiche Appendix 1, pages 1–43 is attached hereto and contains a sample computer readable code for implementing various aspects of this invention. One skilled in the art can practice these aspects by reviewing the computer readable code sample in Appendix 1. Appendix 1 is a part of the present disclosure and is fully incorporated by reference in its entirety.

BACKGROUND

1. Field of the Invention

This invention relates to the field of computer software and, more specifically, to a method and system for monitoring and recording user actions and events that occur during development and maintenance of source code and related data in a software application. In certain embodiments, system features facilitate the maintenance and development of software code by providing an efficient editing environment.

A portion of the disclosure of this patent document contains material which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for the purpose of providing an enabling disclosure by way of example and shall not be construed to limit the scope of this invention to material strictly associated with such marks.

2. Background Art

Until fairly recently, the general public was relatively unaware of the importance of and the problems associated with software maintenance. In the past years, the highly controversial millennium bug (also known as the Y2K bug) brought issues related to software maintenance to the center of the public's attention. Due to time and economic limitations associated with the development of software, a software developer may not have the luxury or the foresight to predict all events and changes that may affect the performance of the software after its release. Thus, software applications need to be updated, maintained, and reconfigured continuously to meet newly developed technological advances and social needs.

In addition to the knowledge and background of the individual maintaining and developing a software application, maintenance of the software application is highly dependent on the quality of the application and also on the detailed documentation of the various portions of the code or other data that composes the software as a whole. While there are methods available to a software developer to describe the functionality of each code segment or reasons for modifying the code, typically, software developers do not exercise such degree of care because of the time constraints associated with the maintenance and development of software applications. Lack of diligence in adequately documenting computer readable code can lead to development of a complex software product, that includes thousands of lines of code, and that is difficult to maintain because of inadequate documentation. Unfortunately, some computer applications are incomprehensible even to the people who wrote them in the first place, not to mention the people who work on the application, years later over the life of the application.

To illustrate how difficult it is to understand and maintain a software application that does not include proper documentation, it is noteworthy to quote Mr. Alan Greenspan, the current Chairman of the Federal Board of Reserve and Federal Open Market Committee. During his testimony to the U.S. Joint Economic Committee in May 1998, about the Y2K problem, Mr. Greenspan stated "I know how complex some of the problems are because I was one of those people who wrote some of the programs, which are creating the problems today. I know that I did not document them in the way in which even I, if I were to see the programs today, could figure out what was done."

Many software programs written as far back as thirty years ago are still being used and maintained by major businesses and corporations. Much time and money is and has been expended by many businesses to determine changes made to software applications over the years by various computer programmers. It would be beneficial to a programmer who maintains computer readable code to have the advantage of knowing, with certainty and detail, the changes that have been previously made to the code and reasons for such changes. Further, because, typically, a substantial amount of time is spent to review and modify computer readable code, it is desirable to record the time spent by different people on different parts of the code for billing and accounting purposes. Currently available systems are inadequate to accomplish the above objectives because they are overly manual, time intensive, and fail to provide a programmer with sufficiently detailed information. They further lack advanced commenting, reporting or time tracking features.

A method and apparatus is needed that can provide a software developer with the tools to track the development of a software application and to determine the changes and/or attempted changes to computer readable code in an efficient manner. Efficient commenting, time tracking, billing, and reporting features are also essential. This invention and its advantages and improvements over the prior art schemes will be better understood and appreciated after reviewing the following detailed description of the invention.

SUMMARY

The invention is directed, in one or more embodiments, to a method and system for documenting and tracking user actions and events that occur during creation, development, and modification of computer readable code (also referred to as source code). Features of the system facilitate the development and maintenance of computer readable code. User actions and events, including editing modifications, are detected and recorded in detail in a controlled environment by monitoring user interaction with the source code. In addition, the nature and context of changes made to the source code are detected and recorded when the point of focus in the source code changes from one position to another. The point of focus is a controlled point in the source code that changes position as a result of user interaction with the system.

In certain embodiments, detected user actions and modifications in lines of code are recorded in a transaction log. A transaction log is, typically, an electronic file or other data structure made up of series of entries (i.e., records), where an entry includes information about a user action, event, or modification in the source code. A record in the transaction log may be implemented physically across multiple databases or data management structures. Source code for a computer system can be contained in one or more code modules. Typically, one or more records or entries in the transaction log correspond to at least one line in the code module that is modified. In some embodiments, other data structures (e.g., tables, arrays, etc.) are used to store, sort, or otherwise manage certain data entered by the user (e.g., search terms), or data already included in the source code (e.g., variable names, definitions, etc.).

In certain embodiments, the system monitors and records information relating to the identity of a user editing the code module, time and date the module was modified, amount of time spent by a user during modification, code module's project identification, and the points of focus at the time of modification. In some embodiments, user comments, the module's name, and its location of storage are recorded, as well.

Embodiments of the invention include certain reporting features. The reporting features are used to aggregate information recorded by the system and generate reports in print or on a display screen. These reporting features integrate with commercially available word processing and accounting software such as Microsoft Word®, Acess®, and Excel® to allow for fast and easy generation of customized and/or pre-formatted reports. Time and expense reports are processed and generated to notify and update a user about the progress and billing status for multiple projects, for example. The system is also designed to integrate with and use commercially available database and data management systems such as Microsoft Access®, Microsoft Data Engine® (MSDE), and server systems that support Structured Query Language (SQL). The data management software named above are provided by way of example. The invention, in other embodiments, can be used in conjunction with any data management or data processing software.

Embodiments of the invention also include certain search and referencing features that instantly provide a user with information about variables defined in the source code. A variable is the name used to refer to a particular data structure. A variable is defined in the source code and is typically assigned a value. A variable definition can include information about the type, size, domain, inheritance, and class assigned to that variable. In certain embodiments, when a user selects, points to, or otherwise references a variable in the source code, information that define the variable is displayed in a pop-up window or other forms of graphical user interface. This allows the user to quickly discern the definition for a variable without having to change the point of focus in the source code to the point that includes the definition of the variable.

The system also includes features that allow a user to view dependencies among variables, such that the user can determine definition or type conflicts among dependent variables. Variables are dependent when change in the value of one results in change in the value of another. Thus, in accordance with one aspect of the invention, when a user selects, points to, or references a variable in the source code, the system displays a list of variables that are dependent on the chosen variable. In some embodiments, the system displays a list of variables upon which the chosen variable depends. The list can further include information about the definition and values assigned to the listed variables.

Modifications made to a line in the source code are detected and recorded in the transaction log as one or more entries. Therefore, a modified line in the source code, typically, corresponds to one or more entries in the transaction log. In some embodiments, the system is configured to allow a user to jump from one line in the source code to a related entry in the transaction log and vise versa. For example, if an entry in the transaction log is associated with a modification made in a certain line in the source code, then if the user selects that entry then the system displays the modified line. This allows the user to quickly refer back and forth between a line modified in the source code and the corresponding entries for that line in the transaction log.

Certain features of the invention allow compound search queries that include more than one search term and/or condition. Lines of code in the source code can be also marked electronically so that a user can go to a specific line in the code by referencing the mark from anywhere within the source code. According to one or more aspects of the invention, the content of the source code or the transaction log can be color-coded to enhance the visibility of specific terms or modifications in the code. The color-coding scheme can be based on the appearance of one or more terms in one or more lines, for example, or can be based on other search criteria and conditions as requested by the user.

One or more embodiments of the invention include commenting features that allow a user to more efficiently annotate the code with comments and certain index information (e.g., user id, project id, identifying text-strings, user comments, modification time and date, etc.). The annotations can be inserted in different levels, in association with one or more lines of code or selected blocks of code. At one level, the annotations are entered in a special section of the source code (e.g., a comment block) reserved for such purpose. At another level, annotations are included in, before, or after a line of code. At yet another level, the user can select a block of code to be encapsulated between comments and other selected information.

BRIEF DESCRIPTION OF THE DRAWINGS

FIG. 2B illustrates an example of comment block in a code module written in the Cobol programming language, according to one or more embodiments of the invention.

FIG. 2F illustrates an example of the content of a transaction log, in accordance with one aspect of the invention.

FIG. 2I illustrates an example of another report generated in accordance with one or more embodiments of the system, based on information recorded in the transaction log.

DETAILED DESCRIPTION

The invention is directed to a method and apparatus for monitoring and recording user actions performed while maintaining computer readable code and the result of said actions. In the following description, numerous specific details are set forth to provide a more thorough description of embodiments of the invention. It is apparent, however, to one skilled in the art that the invention may be practiced without some or all of these specific details or variations in said details. In some instances, certain well-known features have not been described in detail so as not to obscure the more relevant aspects of the invention.

SYSTEM ARCHITECTURE

In one or more embodiments of the invention, a computer system is utilized to monitor, record, and report actions performed by a user during the development and maintenance of software code. Typically, a computer system is composed of two distinct environments, a software environment and a hardware environment. The hardware environment, as it is discussed in further detail below, includes the machinery and equipment that provide an execution environment for the software. On the other hand, the software environment provides the execution instructions for the hardware environment.

In operation, a computer system needs both the hardware and the software environments to function. The software environment can be divided into two major categories: system software and application software. As it is further discussed below, system software is made up of control programs, such as the operating system (OS) and information management systems, that instruct the hardware how to function and process information. Application software more directly interacts with a user and processes specific information for a user (e.g., editing or word-processing applications). In short, the hardware environment specifies the commands or instructions it can follow and the software environment provides those commands or instructions to the hardware.

Figure 1:
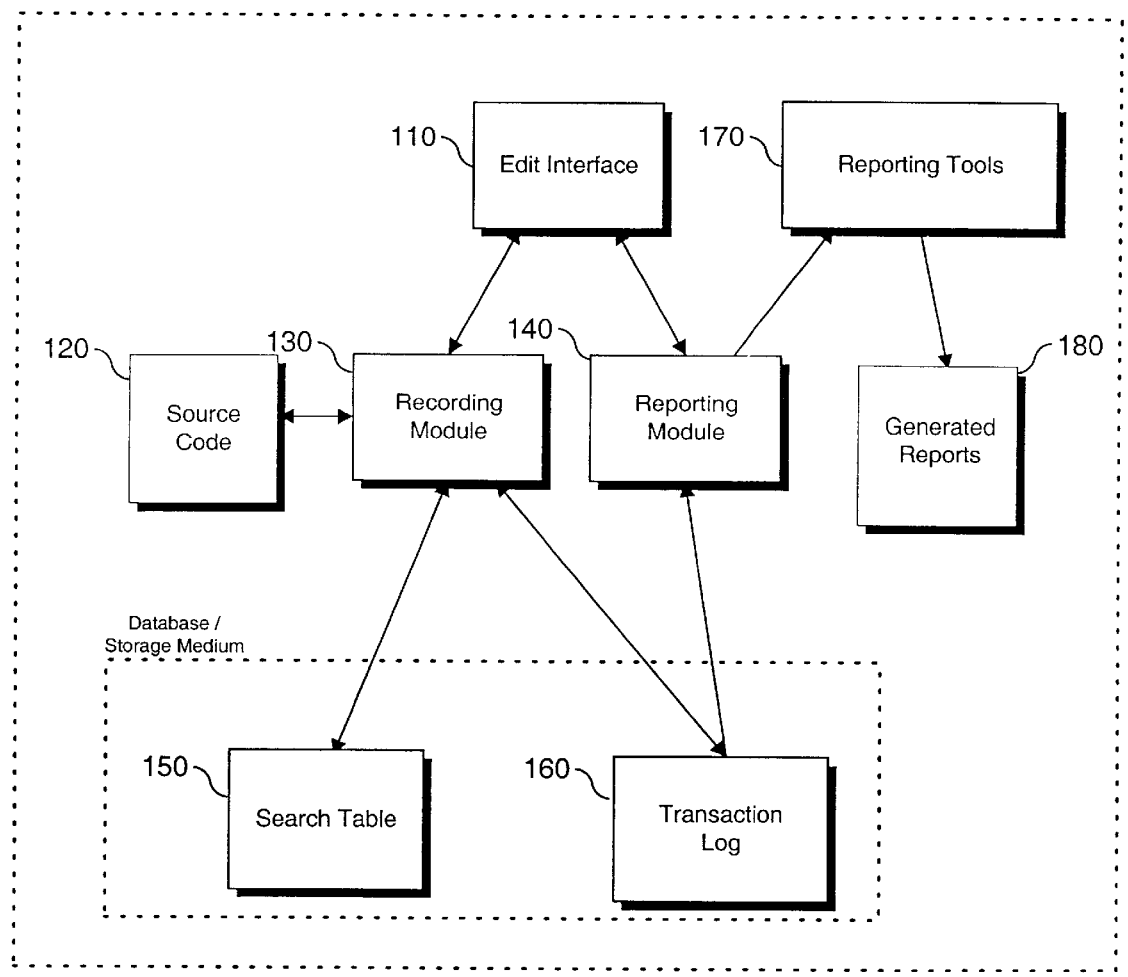
FIG. 1 illustrates a block diagram of the components of the system of this invention and the flow of information between the components, according to one or more embodiments.

As it is illustrated in FIG. 1, the invention in one or more embodiments includes a system 100 that is utilized for editing and maintaining source code 120. Source code 120 includes computer readable code that can be grouped into one or more code modules, for example. Code modules are designed to handle a specific task within a larger collection of codes (i.e., source code 120). For the purposes of this disclosure a reference to source code 120 can be a reference to one or more code modules.

Using information gathered from monitoring user actions, system 100 generates reports 180 that include detailed itemized account or a summary of the maintenance procedures performed on source code 120 by a user using system 100. System 100 includes application software that includes a number of program modules. It should be noted that the program modules that form the components of the application software of system 100, are distinct from code modules referenced above in relation with source code 120.

Referring to FIG. 1, application software of system 100 includes edit interface 110, recording module 130, reporting module 140, and one or more data structures (e.g., databases, data tables, data logs, etc.) for storing and managing various information. A database is a data structure wherein related information can be stored, referenced, and managed. One embodiment of the system includes search table 150 and transaction log 160, for example, that are data structures implemented for storing, referencing, and managing information about user interaction with system 100.

Edit interface 110 comprises graphic and interactive tools that allow a user to communicate with system 100. Recording module 130 is the part of the system that monitors and records various user actions (e.g., open module, search for text string, delete, etc.) performed during the maintenance of source code 120. In some embodiments, module 130 also tracks and records non-user-initiated events. For example, if the user initiates a search for a term, the system in addition to tracking and recording the search request (i.e., a user initiated action) also records the result of the search request (i.e., whether the search term was found or not found). Further information about the point of initiation of the search in the code, and the point where the search term is found is also recorded. Recording module 130 also records information about the name and storage location of source code 120, as well as information on related modules and projects (e.g., the project id, time spent on each project, time and date the source code and related data files were opened or closed, etc.). In certain embodiments, recording module 130 also records information indicating whether the action or event took place during a session that was related to maintaining existing code or a session that was initiated for the purpose of developing new code.

The above information is recorded by recording module 130 in transaction log 160. Transaction log 160 is a data structure (e.g., in form of an electronic file) that contains entries (e.g., records) that include or reference various information about user interaction with source code 120. In some embodiments, if the action is a search request, the system in addition to recording the particulars of the search request in transaction log 160, also stores the search term (i.e., a text string) in search table 150.

As shown in FIG. 1, in certain embodiments, search table 150 and transaction log 160 are implemented in a single database architecture; in other embodiments, the two data structures are implemented in two or more separate and distinct databases. Search table 150, in one or more embodiments, is indexed so that a user can easily look for, sort, and review terms and text strings searched by the user or previous users. Information stored in an entry in transaction log 160 may be implemented across one or more data structure, for example, in multiple files linked together in a relational or fixed database. In embodiments of the invention, information stored in transaction log 160 can be accessed by reporting module 140 for generating various up-to-date reports about the maintenance activities performed on source code 120.

Record Formats

Information is stored in transaction log 160 in a format commonly referred to as a record. A record is a data structure that includes one or more fields. A field represents a unit of data and includes information about a user action or event (e.g., date, time, type of action, etc.). In one or more embodiments of the system, a record represents an entry in transaction log 160. In embodiments of the invention, transaction log 160 can be physically implemented across one or more data structures. For example, transaction log 160 may be implemented across one or more databases or data records with fixed or relational links between multiple records. An entry or record in transaction log 160 can be associated with one or more events or user actions.

Information about an event or user action can be stored in transaction log 160 as one or more records having the format illustrated in Table 1 below, for example. The format of and information included in the examplary record shown in Table 1 may vary depending on design and system implementation. Further, a record may include fields in exclusion or in addition to the fields illustrated in Table 1. It is noteworthy that the formatting and information shown in the record and fields illustrated in Table 1 are simplified for the purpose of illustration and are provided by way of example. As such, a field or record can be physically implemented across one or more data structures and may include more detailed attributes than shown.

TABLE 1

EXAMPLE OF A RECORD FORMAT

| | |
|---|---|
| Record ID: | Unique record identifier |
| Type of Action: | Reference to the action or event |
| Text: | Details about action or event |
| Date: | Date action or event occurred |
| Time: | Time action or event occurred |
| User ID: | Unique user identifier |

Details about a user action or event such as the time, date, and other related information are stored in one or more fields included in one or more records associated with that action. A record in transaction log 160 includes, for example, a field for storing a unique identifier for that record, so that each record is uniquely identifiable by system 100. A record may also contain one or more fields that indicate the type of action performed. In embodiments of the invention, each record includes a field containing the date and time the action was performed or the date and time the entry was recorded in transaction log 160.

In addition to the above fields, other fields can also be included in each record to provide additional relevant information. For example, a text field may include data that indicates the reason an action or event occurred, or a unique text string for identifying the context in which a modification to source code 120 was made. A record may, in addition to or in exclusion of one or more of the above fields, include one or more fields that contain other relevant information about an action taken by the user, in no particular order or alternatively in a predetermined order.

For example, a field may include a project identification number to identify the project being modified. Another field may include a detailed description of the action performed. Various information such as the line or sequence number at which the action or event occurred, the content of the line before modification, and the content of the line after modification can be also included. Table 2 below, provides a list of various types of actions and field content for each type of action that is recorded by recording module 130, according to one or more embodiments of the system.

TABLE 2

EXAMPLE OF TYPES OF ACTION

| | Mnemonic Tag | Text Field Contents |
|---|---|---|
| 1 | Close Module | The path and name of the module |
| 2 | Close Session | "End of session" |
| 3 | Delete Line Number | The line number of the line deleted |
| 4 | Delete Text | The line deleted |
| 5 | End, No Match | The search argument |
| 6 | Error Record Number | The error number and any explanatory text |
| 7 | Start From Line | The line number of the current line |
| 8 | Go Find | The search argument |
| 9 | Go Find Next | The search argument |
| 10 | Insert Line No. | The line number of the line inserted |
| 11 | Insert Text | The line inserted |
| 12 | Match Line Number | The line number of the line found |
| 13 | Module Save As | The path and name of module assigned by the user |
| 14 | Open Module | The path and name of the module |
| 15 | Open Session | "Start of Session" |
| 16 | Replace Line Number | The line number of the line replaced |
| 17 | Save Module | The path and name of the module |
| 18 | Text After | Content of a modified line after modification |
| 19 | Text Before | Content of a modified line before modification |
| 20 | Text Matched | The line found |
| 21 | Print Module | The path and name of the module printed |
| 22 | Project ID | The project name |
| 23 | Unable to Replace | The text of the replacement line |

As shown, each action or event is associated with a mnemonic tag and a text field. The mnemonic tag represents the information recorded in transaction log 160 to describe the type of user interaction detected. The text field includes information about content of the point of focus or other information describing the user action or event. The mnemonic tags and text field contents included in Table 2 are provided by way of example only. For the purpose of illustration, parts of this invention are described here as applicable to record formats included in Table 2. However, other record formats are also possible. For example, Table 3 below illustrates an alternative record format for recording and representing information about various user actions and events.

TABLE 3

ALTERNATIVE EXAMPLE OF TYPES OF ACTION

| | Event | Type | Description |
|---|---|---|---|
| 1 | Move | Block | Move Block |
| 2 | Move | Insert | Move & Insert |
| 3 | Move | Delete | Move & Delete |
| 4 | Move | Replace | Move & Modify |
| 5 | Insert | Line | Insert Line |
| 6 | Replace | Line | Modify Line |
| 7 | Delete | Line | Delete Line |
| 8 | Remove | Block | Delete Block |
| 9 | Remove | Replace | Delete Text & Modify Line |
| 10 | Remove | Delete | Delete Line |
| 11 | Cut | Block | Cut Block |
| 12 | Cut | Replace | Cut Text & Modify Line |
| 13 | Cut | Delete | Cut Text & Delete |
| 14 | Paste | Block | Paste Block |
| 15 | Paste | Insert | Paste Text & Insert |
| 16 | Paste | Replace | Paste Text & Modify Line |
| 17 | Paste | Delete | Delete Selected Line |
| 18 | Find | String | Find String |
| 19 | Find | String Case | Find String- Case |
| 20 | Find | Whole Word | Find Whole Word |
| 21 | Find | Whole Word Case | Find Whole Word Case |
| 22 | Find | Replace | Find & Replace |
| 23 | Find | Replace All | Find & Replace All |
| 24 | Find | Found | Find Text Found |
| 25 | Find | Not Found | Find Text Not Found |
| 26 | Template | Block | Insert Template |
| 27 | Template | Replace | Template Modify Line |
| 28 | Template | Insert | Template Insert Line |
| 29 | Auto | Block | Auto Block |
| 30 | Auto | Replace | Auto Modify Line |
| 31 | Auto | Insert | Auto Insert Line |
| 32 | File | Save | Save |
| 33 | File | Save As | Save As |
| 34 | File | Not Saved | File Not Saved |
| 35 | File | Print | Print |
| 36 | File | Import | Import |
| 37 | File | Export | Export |
| 38 | File | Check-in | Check-in |
| 39 | File | Check-out | Check-out |
| 40 | File | Open | Open |
| 41 | File | Activate | Activate |
| 42 | File | De-Activate | De-Activate |

While, Tables 2 and 3 include novel recording formats, in accordance with one or more aspects of the invention, other recording formats may be implemented by one skilled in the art. As such, various recording formats can be utilized to store information relevant to actions or events that occur during the modification of source code 120. Different record formats can record and provide different degrees of detail about a certain action or event.

Referring to Table 2, for example, when a user replaces or modifies a line of code in source code 120, recording module 130 detects that event (e.g., represented by entry 16 in Table 2) and records an entry in transaction log 160. The entry includes a field containing a reference to the type of user action taken (e.g., "replace line number") indicating that a line of code was modified or replaced in source code 120.

The system detects a change in source code 120 by monitoring a change in the point of focus. The point of focus is a position in source code 120 that changes based on user interaction with the system. In this example, the point of focus is the line of code where the replacement was made. As shown in Table 2, when the point of focus changes (e.g., when the user moves from one line to the next) the system records an entry in transaction log 160 that includes the position and/or content of the point of focus in source code 120.

In embodiments of the invention, the system monitors the point of focus based on the location of the cursor on the display screen. The location of the cursor on the screen can be represented by a x-y coordinate system, where x and y respectively represent the row and column on which the cursor is located on the screen. Change in the point of focus can be thus determined based on changes in the values associated with x and y. In one embodiment, the point of focus is the line in the source code where the cursor is located. As such, the system detects a change in point of focus when the cursor is moved from one line to another line. Thus, to monitor the point of focus at the line level, the system detects a change in the point of focus when the value of x changes.

Point of focus in certain embodiments may be a reference to a position in source code 120 at levels other than the line level. For example, in one embodiment, the point of focus may include a reference to the paragraph in which the action took place, or alternatively it may refer to the exact word, character, or symbol that was modified as the result of an action or event. To detect a change in the point of focus at various levels, the system may monitor changes in both x and y values. In some embodiments, the content of the point of focus (e.g., if the point of focus is a line then the content of the line of focus, if the point of focus is a word then the word, etc.) is recorded. In some embodiments the content of the point of focus before and/or after modification is recorded in transaction log 160 (e.g., see entries 18 and 19 in Table 2).

In an alternate embodiment of the invention, the system tracks changes or references to one or more points (e.g., pixels) on the display screen whether or not that point is positioned within the source code 120. For example, the system can detect a change in viewing of a portion of the source code when a user uses a scroll bar, for example, to scroll up and down. A change in the point of focus is detected when one or more pixels on the screen change as the result of user interaction with the system. Certain changes to pixel characteristics (e.g., color, transparency, etc.) may signify a recordable event or action resulting from user interaction with the system. If the system determines that the change is associated with a recordable action or event, then the associated action or event is recorded in transaction log 160 as a record in addition to other relevant information.

In accordance with other aspects of the invention, a different record format, such as that illustrated in Table 3, may be utilized to record information in transaction log 160 in the above scenario. The recording format illustrated in Table 3 provides information about user actions or events in a specific context. For example, entries 4, 6, 9, 12, 16, 22, 23, 27, and 30 describe various contexts (e.g., move, line, remove, cut, paste, find, etc.) in which a replace action can occur.

An entry recorded in transaction log 160 in accordance with the formatting requirements of Table 3, in addition to providing the user with information about a line replacement, for example, also includes information indicating that the line was replaced in a certain context. For example, a recorded entry (e.g., entry 4) can indicate that the line was replaced with a blank space when the line was moved from one location in source code 120 to another. Alternatively, a recorded entry can also indicate that the line was replaced with another line (e.g., entry 6), or was removed, cut, or pasted (e.g., entries 9, 12, 16). As such, entries recorded in transaction log 160 can be more or less context specific depending on the formatting requirements implemented for that entry.

For example, a record based on the formatting requirements of Table 3 includes the following fields, illustrated in Table 4, below:

TABLE 4

ALTERNATIVE EXAMPLE OF RECORD FORMAT

| Code Module | EXAMPLE02 |
|---|---|
| Date | 04/05/00 |
| Time | 09:46 |
| Action | Find & Replace |
| Attribute | Text Before |
| Line No. | 000100 |
| Activity Detail | "Content of the line" |

A recorded entry in the above format indicates that on Apr. 05, 2000 at 9:45 a user interacted with system 100 to find and replace a term at line number 100 in source code 120 contained in a code module entitled "EXAMPLE02". The Activity Detail field includes the content of line 100. The Attribute "Text Before" indicates that the Activity Detail field includes the content of line 100 before the replacement. The record formats illustrated in Tables 1and 4 are provided by way of example, only. Other record formats including additional fields or details may be implemented in other embodiments of the invention. Each record or field, in one or more embodiments, may be implemented across one or more data structures.

APPLICATION SOFTWARE

In accordance with one aspect of system 100, the application software includes an edit interface 110 that allows the user to view and modify the content of source code 120. The edit interface 110 and other features of system 100, in certain embodiments, are implemented in form of a software application designed to operate concurrently and transparent to other system functions. In addition to the standard editing tasks (e.g., insert, delete, cut, paste, move, replace, etc.) edit interface 110 includes features useful for modifying, commenting, searching, or viewing certain portions of source code 120 and related data files.

Figure 2A:
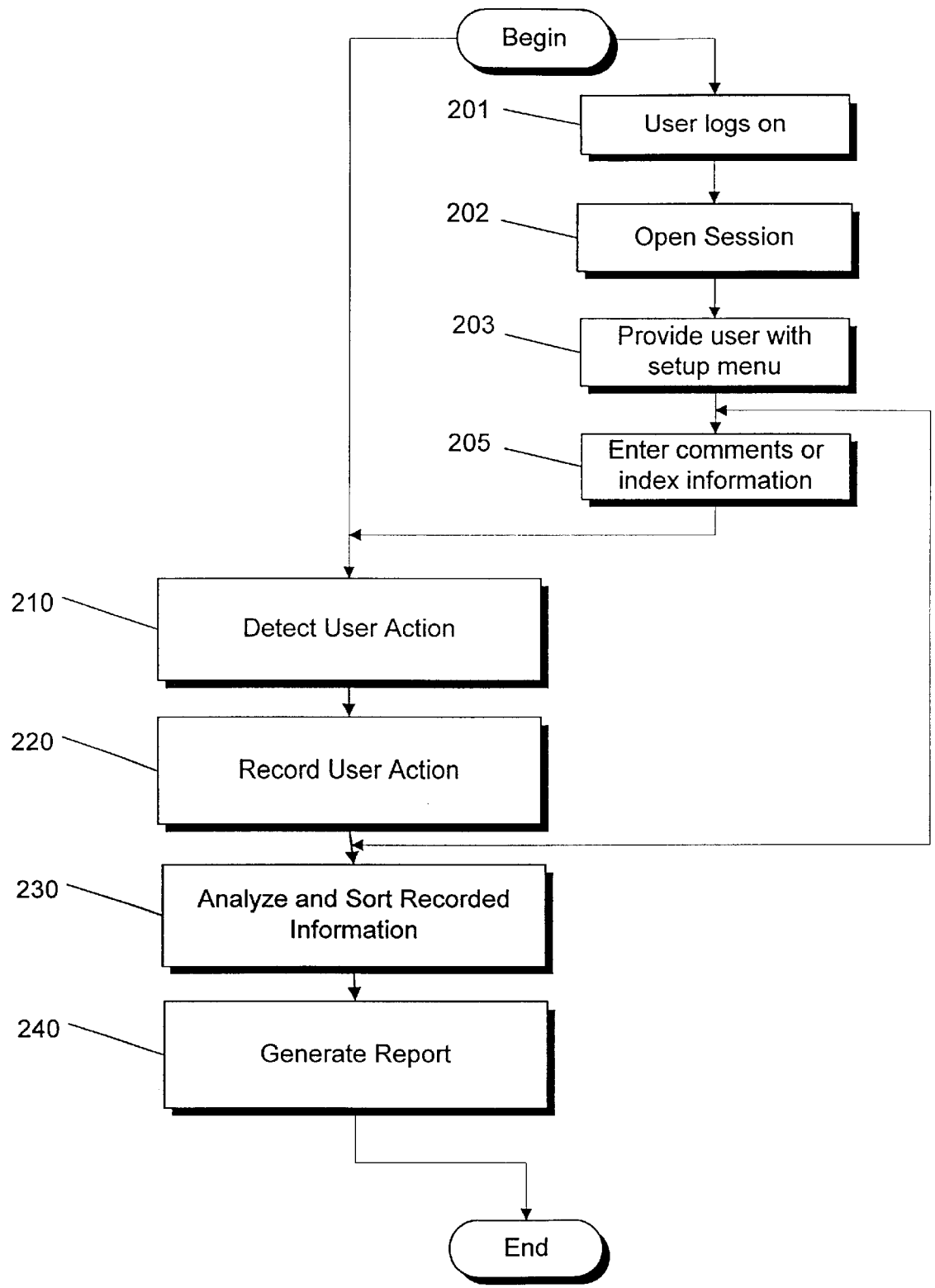
FIG. 2A is a flow diagram of a method of handling user interactions with the system of FIG. 1, during maintenance of computer readable code, according to one or more embodiments of the system.

FIG. 2A describes a method in accordance with one or more aspects of system 100 for modifying source code 120. In one or more embodiments, the user initiates system 100 by logging on to system 100 at step 201 (e.g., by entering a user ID and password). The user then proceeds to open an edit session to modify source code 120, at step 202, by entering or selecting the name of the code module that contains source code 120.

Commenting Feature

Edit interface 110, in embodiments of the invention, includes commenting features that allow a user to annotate source code 120 in various regions and at different editing levels. Edit interface 110 in one or more embodiments can be configured to automatically comment a modified line of code with information useful in understanding the nature of changes made. This information also referred to as index information, for example, includes information such as, user id, project id, time and date of modification, name of the code module or application being modified, one or more text strings, and a flag indicating the context in which the modification was made (e.g., code maintenance or development). Other attributes or information that describe or define a user action or event and can facilitate a user's understanding of the development and maintenance of source code 120 may be included, as well.

In some embodiments, the system can be configured to automatically insert a unique text string in a modified line of code to indicate that the comment was entered in a certain context. This allows the user to track and identify modifications made in a specific context by searching for the specific text string associated with that context. For example, a user in the second stage of development of a software program may want to identify all changes made during the second stage by including text string "V2.2" in each line modified or in each comment entered to reflect that a line was modified as part of making version 2.2 of the software program. As described in further detail below, this can be accomplished by activating certain commenting features of the system.

Setup Menu

Referring to FIG. 2A, in accordance with one aspect of the system, a user can cause the system to automatically comment source code 120 after the user logs in, at step 201, and opens a module for modification, for example. In some embodiments, at step 203, the system provides a user with a setup menu prompting the user to enter comments about the purpose of modifying source code 120 and/or a description of changes that are to be made to the code, for example. A user can enter his or her comments in a text box or by using other data entry interfaces that may be provided by the system.

Depending on the programming language, certain regions in a source code are reserved for entry of comments. For example, in the Cobol programming language, comments regarding the development and maintenance history of the source code are customarily included in an area that appears towards the beginning of the source code. We refer to this area as the comment block. FIG. 2B illustrates an example of a comment block in a Cobol source code including comment lines 1 through 18. At step 205, comments entered by the user are entered in the comment block of source code 120.

The setup menu, in certain embodiments, also provides a user with the option to indicate whether the modifications are being made in order to maintain previously written code, or if the modifications are entered during the development of new code. This is accomplished by setting an indicator (e.g., flag) in an entry recorded in association with a modification in source code 120. If the indicator is set, for example, then it indicates that the modification was made as part of maintaining the code. If the indicator is not set, then it indicates, for example, that the modification was made as part of developing the code. As it is described below, the system later uses this distinction to generate detailed reports about the amount of time spent on the code for different purposes.

Preference Menu

Figure 2C:
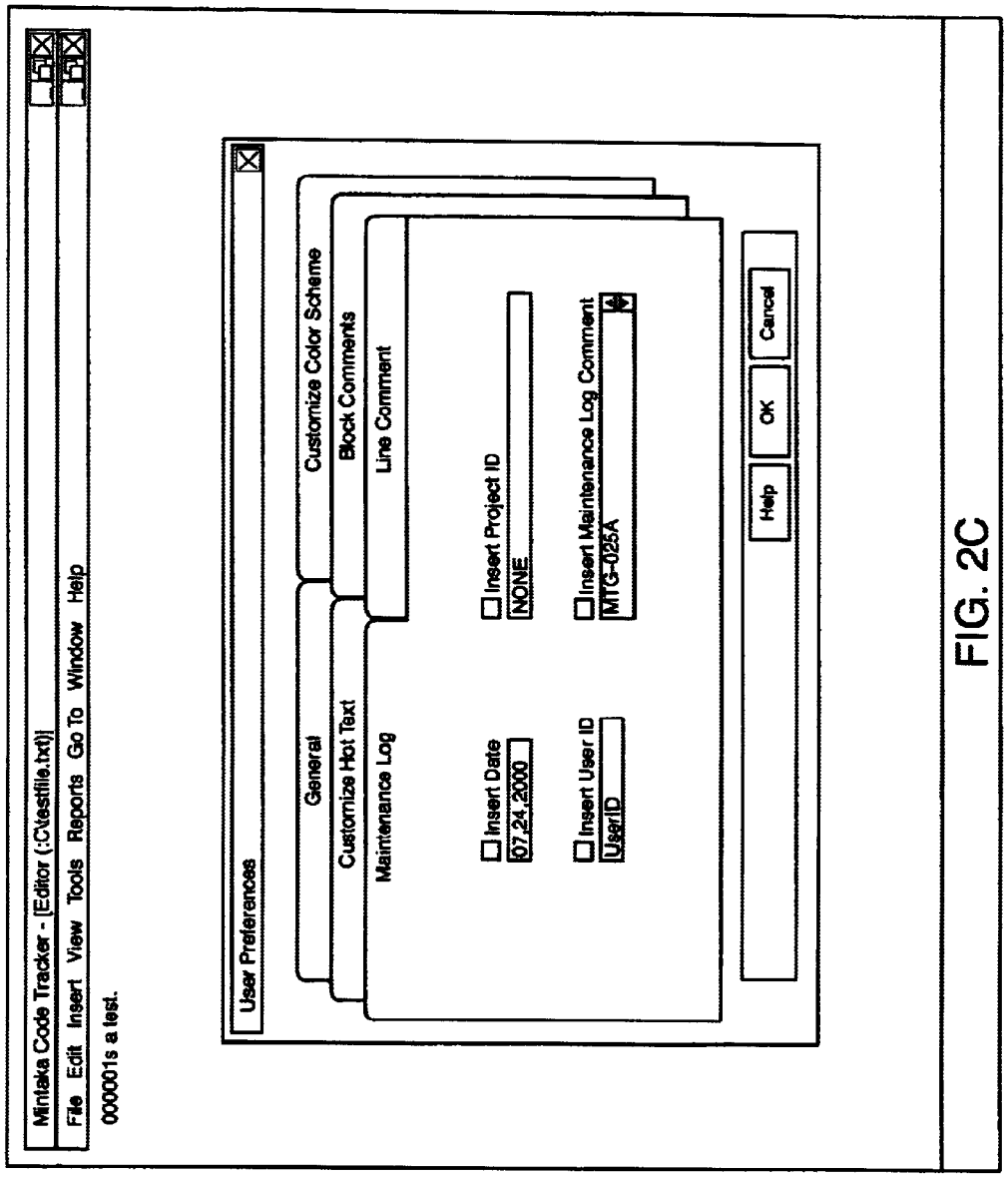
FIG. 2C illustrates an example of a preference menu provided to a user, in accordance with one or more embodiments of the system, for commenting source code in the comment block.

In embodiments of the invention, edit interface 110 includes a preference menu, that among other features includes a feature that allows a user to enter comments and/or select one or more index information to be included in the comment block. FIG. 2C illustrates an example of a user preference menu, according to one embodiment of the system. As shown, a user can select certain index information (e.g., date, project ID, user ID) to be included in the comment block of source code 120. In addition to index information, a text box or other means for text entry are provided to allow a user to enter specific comments for inclusion in the comment block of the code. Check boxes or other selection means (e.g., radio buttons, drop down menus, etc.) may be used to allow a user to select or deselect the entry of index information or user comments in the comment block. In some embodiments, the user may access the preference menu at anytime after step 203 by interacting with menu options provided by edit interface 110.

Figure 2D:
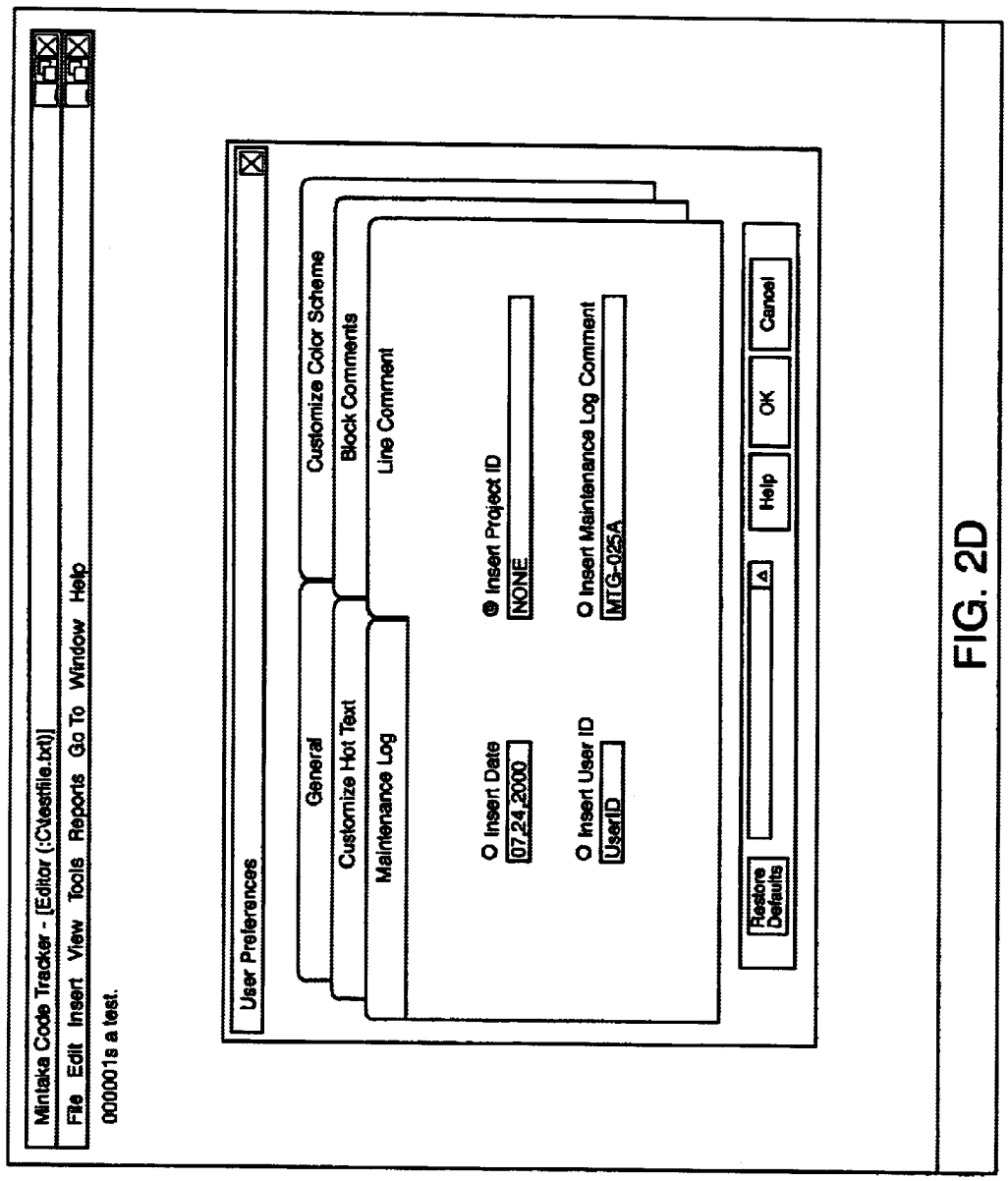
FIG. 2D illustrates an example of the preference menu of FIG. 2C, according to one or more embodiments of the invention, providing the user with a feature that allows the user to cause the system to automatically comment source code at the line level.
Figure 2E:
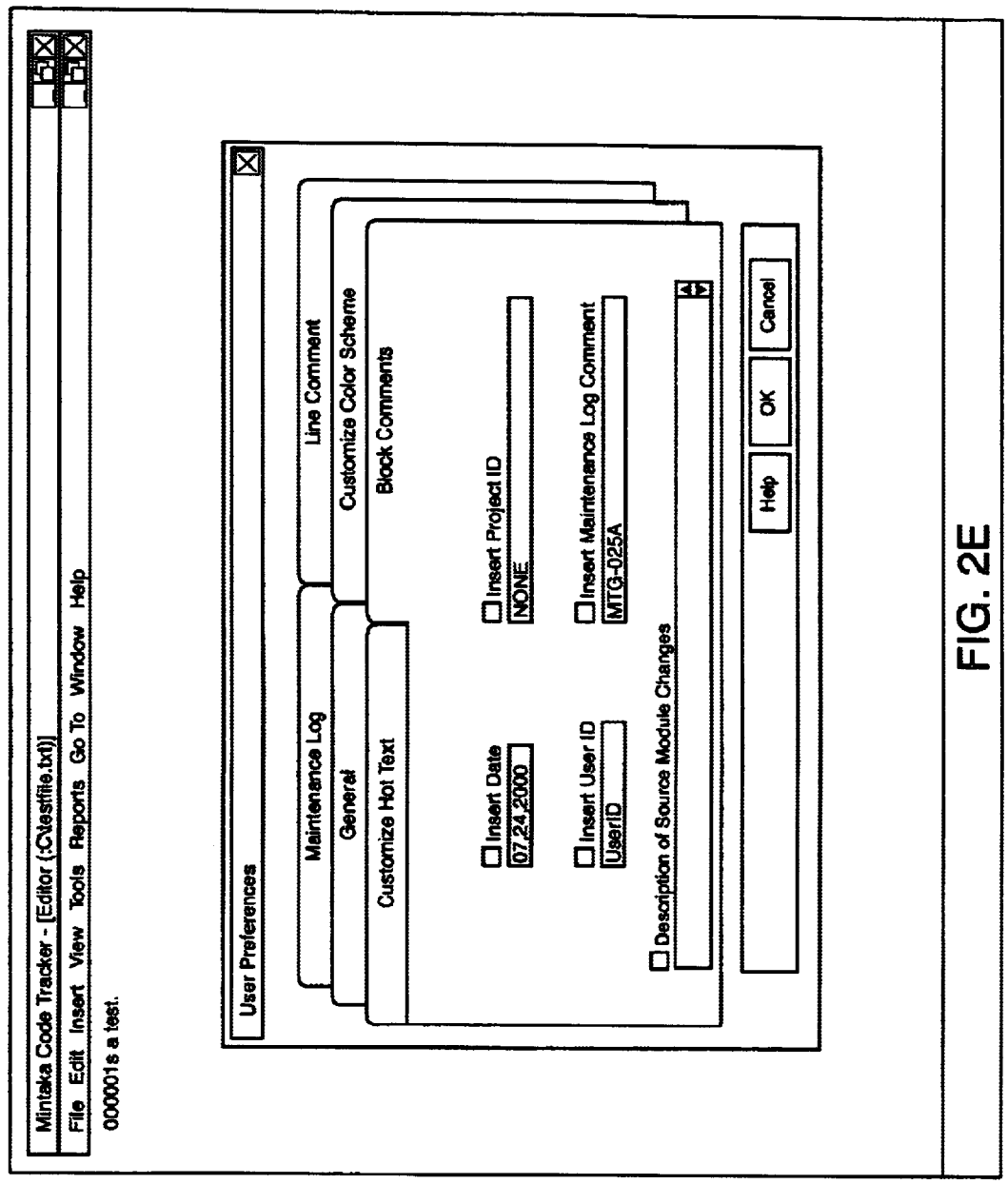
FIG. 2E illustrates an example of the preference menu of FIG. 2C, according to one or more embodiments of the invention, providing the user with a feature that allows the user to select a block of code for commenting.

As illustrated in FIG. 2C, a user may choose to comment lines of code in areas other than the comment block described above. For example, embodiments of the invention are configured to facilitate the entry of index information and comments at line or block level (i.e., the user can choose to enter comments in a line of code, or choose to comment a block of code). In embodiments of the invention, preference menus are provided to allow the user to select or deselect certain index information to be included at line or block level. FIGS. 2D and 2E are examples of preference menus provided in accordance with one or more aspects of the invention that allow the user to annotate source code 120 at the line or block level.

Depending on the programming language, a comment can be entered at the line level in a certain portion of the line (e.g., selected columns), or any portion of the line, if the comment is created within the syntactical requirements for commenting within a given programming language. For example, if a source code is written in the Cobol programming language, text entered in columns 73 through 80 (i.e., suffix portion) of the line and text following an asterisk entered in column 7 are treated as comments. Referring to FIG. 2D, a user can select or deselect various index information to be included in a line of code that is modified by the user.

As briefly noted earlier, some embodiments of the system, allow the user to enter a unique identifying term or keyword to be included in a modified line to identify the context in which the modification occurred. For example, in response to a user action, the system can automatically detect a charge in a line of code and include the keyword "V2.2" in each modified line to indicate that the modification occurred during the creation of version 2.2 of the code.

If the source code is written in the Cobol programming language, for example, the user can choose to activate the line commenting feature of the system so that every time the user modifies a line, selected index information (e.g., the date of modification and the project id) is automatically included in the suffix region of the line. Alternatively, instead of including the selected index information in the suffix region, the system can be configured to automatically include the information as comments encapsulated in between special characters (e.g., asterisks) in, before, or after the modified line, depending on the syntactical requirements of the programming language in which source code 120 is written.

The user may deactivate the line commenting feature by interacting with the preference menu or other system provided menus. In addition to the above commenting features, in one or more embodiments, the system allows a user to annotate a certain block of code by selecting (e.g., highlighting) one or more lines. Using the commenting feature of the system a user, instead of directly entering comments or certain index information in association with a block in the source code, interacts with a preference menu that automatically enters the comments in the appropriate portion of the code.

For example, when the user selects a block of code, the system facilitates the user with the option to enter comments or select certain index information to be inserted in source code 120 before and/or after the selected block, by merely interacting with a preference menu. FIG. 2E illustrates an example of a preference menu, in accordance with one or more embodiments of the invention that allows a user to select or deselect certain index information. A text box is also provided to allow the user to enter comments for the selected block of code.

Annotations made to the code using the above commenting features allow a user to readily understand the nature and context in which any changes are made. In certain embodiments of the invention, any changes in the storage location or the name of the code module that contains source code 120 is tracked and stored in the transaction log 160. Comments entered in the code using the commenting features of the system are also reflected in the transaction log, as the system records the modifications made to source code 120.

Monitoring User Interaction

Referring to FIG. 2A, the system of this invention is implemented to detect a user action, or event, at step 210. To detect the occurrence of an action, the system relies on internal features of the operating system that monitor user interaction with the system via various interface devices. For example, electric signals generated as the result of pressing one or more keys on the keyboard or clicking the mouse on a certain region of the display are captured, in a well known manner, by the system as digital data. Captured data is analyzed by system software to determine the type of action taken by the user.

At step 220, the system determines if the action is a recordable action and records the action. In addition to user actions the system also monitors and reports events that result from user actions. For example, a search request is a user action that results in finding or not finding a search term. Finding or not finding a search term is an example of an event that is recorded by the system. In certain embodiments, the point of focus (e.g., the line number) associated with the event is also recorded. For example, if a search term is found in line 100 then the following statement may be recorded: "Find Txt Found at line 100." Additionally, the system may also record the content of the point of focus (e.g., the content of line 100).

Tables 2 and 3 above, include examples of user actions and events that the system, in one or more embodiments, is implemented to detect and record. As discussed above, information about the event or action taken by the user is appropriately formatted and stored in transaction log 160 in form of records having one or more fields. FIG. 2F is an example of entries recorded in transaction log 160 in accordance with one or more aspects of the invention. Each entry includes information about the name of the code module being modified, identity of the person making the modifications, date and time an event or an action was detected or recorded by the system, the type and context of action, a reference to the location of the line modified in source code 120, and the content of the line before and after modification.

A user can review the information included in each entry and determine the time, date, type, and the context of an action taken and the result of that action in the content of source code 120. The context of an action can be defined by means of recording information about the relationship between the action taken and the point of focus. To illustrate how the entries in transaction log in FIG. 2F are recorded, assume that source code 120 contains lines 100 through 1000 as provided below:

000100 CATS

. . .

000900 CATS BIRDS AND DRAGONS.
000910 CATS AND MOUSE.
000920 CATS AND HAT.

. . .

001000

Referring to FIG. 2F, the first line of transaction log, in addition to including the time and date of the user action, indicates that the user action was to find the word "CATS" starting from line 100 downward in the code. In this example, entry number 20 in Table 3, defines the description (e.g., "Find Whole Word") associated with the user action detected by the system. In embodiments of the system, a user action in addition to being associated with a description is also associated with attribute that provides additional information about the point of focus in source code 120 and or the edit action associated with the point of focus (i.e., the context of the action). We refer to this attribute as the edit attribute.

For example, in one embodiment of the invention, a find action is associated with the edit attribute "Down From". This edit attribute indicates that the search was performed starting from the point of focus in source code 120 downwards. Depending on the user action or edit event detected, a different attribute may be recorded. For example, if the user action is a search request, the resulting event would be the finding of the search term. The description for the event can be "Find Txt Found" (e.g., entry number 24 in Table 3). The edit attribute associated with that entry can be "At" followed by the point of focus (e.g., line number) where the search term was found.

Reviewing the content of the transaction log in FIG. 2F, a user can determine that on Apr. 5, 2000, at 9:45, code module EXAMPL02 was searched for the term "CATS" starting at line 100 and that the term "CATS" was found on line 100 at 9:45. Further, it can be determined that on the same date at 9:46 a request for finding and replacing a term was recorded by the system. By reviewing the recorded activity detail it can be determined that the request was for replacing "CATS" with "RATS", because lines 3 and 4 indicate that line 100 was modified from "CATS AND DOGS" to "RATS AND DOGS."

Entries 5 through 13 indicate that the rest of the code module was searched for the term "CATS" and that all occurrences of the term "CATS" on lines 900, 910, and 920 were detected by the system and said occurrences were replaced by the term "RATS". As shown in lines 7 through 12 in FIG. 2F, in embodiments of the system, the description for finding and replacing a term is "Find & Replace". This user action is associated with edit attributes (e.g., "Text Before" and "Text After") that refer to the content of the line of focus before and after the action is completed. The above terms used for describing a user action, event, or attributes associated with them are provided by way of example. In alternative embodiments, different descriptive terms can be used to describe the above actions, events, or attributes.

Reporting Recorded Information

Referring back to FIG. 2, the system at step 230 analyzes and sorts recorded information in transaction log 160 such that reporting module 140 can access and retrieve the information and generate reports 180, at step 240. The generated reports may be in form of text, charts, tables, graphs, or other data representation methods. FIGS. 2G through 2J illustrate examples of different kinds of reports that can be generated by reporting module 140.

As it is described in further detail below, a report can include selected information from transaction log 160 and this information can be presented to a user as printed documents or on a display. In one embodiment, a report can be presented as a view of the content of one or more rows, columns, or specific sections of transaction log 160. Furthermore, a report may be generated based on aggregation of certain information included in transaction log 160.

Figure 2G:
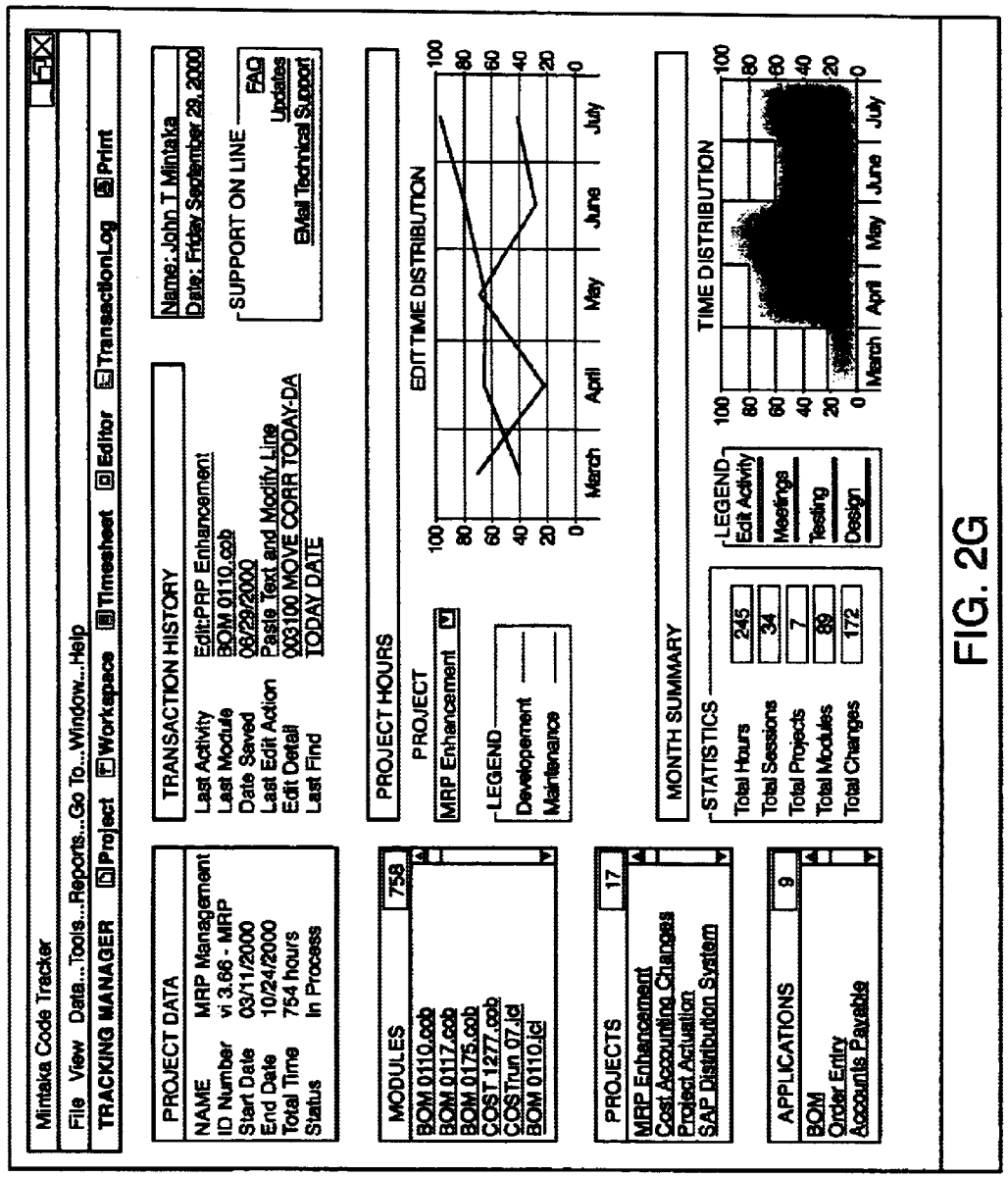
FIG. 2G, in part, illustrates an example of one or more reports generated based on information recorded by the system in a transaction log, in accordance to one or more embodiments of the system.

In one embodiment, information recorded in transaction log 160 is used to generate reports that display information about the number of hours spent on development and/or maintenance of a project or application. In one or more embodiments, this information may be displayed in form of a graph, for example, as illustrated in FIG. 2G. FIG. 2G in addition to charts and graphs includes multiple sections that provide statistical and structural information about source code 120 and a transactional history of the maintenance or development activities performed on source code 120.

FIG. 2G also provides a navigational interface that allows a user to view the reported information in more detail, by for example selecting a button or item from a menu or a list. For example, selecting module "BOM 0110.cob" may cause the system to display a view (i.e., report) of the content of transaction log 160 for entries that pertain to that module.

As illustrated in FIG. 2G, information recorded in transaction log 160 is aggregated to produce a summary of the total number of hours spent on a module or project, per month or other desirable time interval. The system can also track and report the time spent on each project or module based on the type of activity performed by the user (e.g., maintenance, new code development, etc.). Further, detailed information about the name of the latest modules edited, the latest edit event or action, or the date and time that a module was last edited is also displayed, in one or more embodiments of the invention.

Reports 180 can be generated by utilizing reporting tools 170. Embodiments of the invention are implemented to integrate with commercially available applications for generating reports 180. Thus, reports 180 can be prepared in word processing or accounting applications such as Microsoft Word or Excel. Using reporting tools 170, a manager or team leader can generate detailed customized reports about the progress of a project and the costs involved. For example, the system can be queried to generate a report including the number of hours a programmer has worked on a certain project. The report can further include an itemized list of modifications made in the code in chronological or other order. Alternatively, a general synopsis in the form of a predefined report format can be generated by system 100.

Figure 2H:
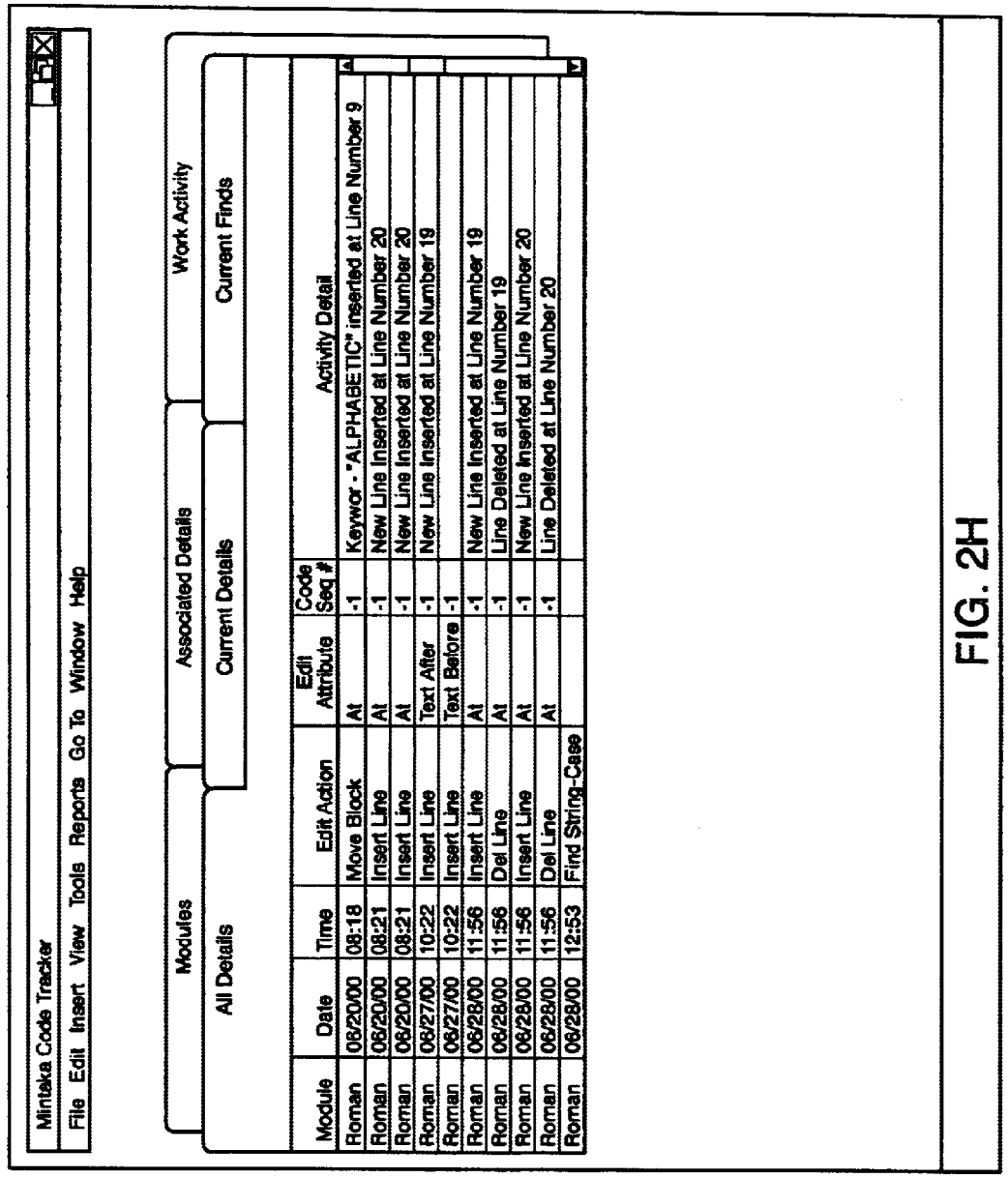
FIG. 2H illustrates an example of a detailed report generated in accordance with one or more embodiments of the system, based on information recorded in the transaction log.

Information recorded in transaction log 160 can be also sorted, grouped, or itemized to provide one or more views of the content of transaction log 160 with various degrees of detail. FIG. 2H illustrates an example of a detailed report (i.e., a view) generated based on information recorded in transaction log 160. The detailed report includes multiple entries recorded in the transaction log that relate to code module entitled "Roman" for example. Each entry includes in addition to the name of the module a reference to the type of user action or event recorded, and the date and time of recordation. Details about the action, such as the point of focus in source code 120 or the content of the line at the point of focus, are also included.

In certain embodiments, a user can cause the system to generate custom reports in form of views of specific lines associated with a certain category of information in transaction log 160. For example, a user may select a view that displays only the comments included in source code 120. Alternatively, a user may select a view that displays only the main headings in source code 120. A heading refers to a first line of code in a group of instructions included in a computer program. This group of instructions is commonly referred to as a subroutine or procedure and is implemented to perform a specific task.

Subroutines and procedures make a computer program more manageable and allow a group of instructions to be called from anywhere in the program, using one procedure call. Accordingly, in embodiments of the invention, custom reports or views can be generated that illustrate those lines in source code 120 that are associated with subroutine headings. In other embodiments, a user can cause the system to generate a report that includes specific instructions (e.g., control transfer instructions (GOTO), or subroutine or procedure calls (PERFORM)).

FIG. 2I is an example of another report generated by the system based on information recorded in transaction log 160 in relation to one or more projects. In embodiments of the system, in addition to detailed information about each user action or event, the system also records detailed information about the time a user started or stopped an editing session. Using this information and comments entered by the user in response to certain prompts provided by the system (at the beginning of the edit session, for example) a detailed report such as that illustrated in FIG. 2I may be generated. The report, in one or more embodiments, includes information about the date on which a project was worked on and the duration of the work, including the time the work started and ended. Further information, such as a general description of the work performed and the name of the users working on the project, is also included.

Figures 2, 2J:
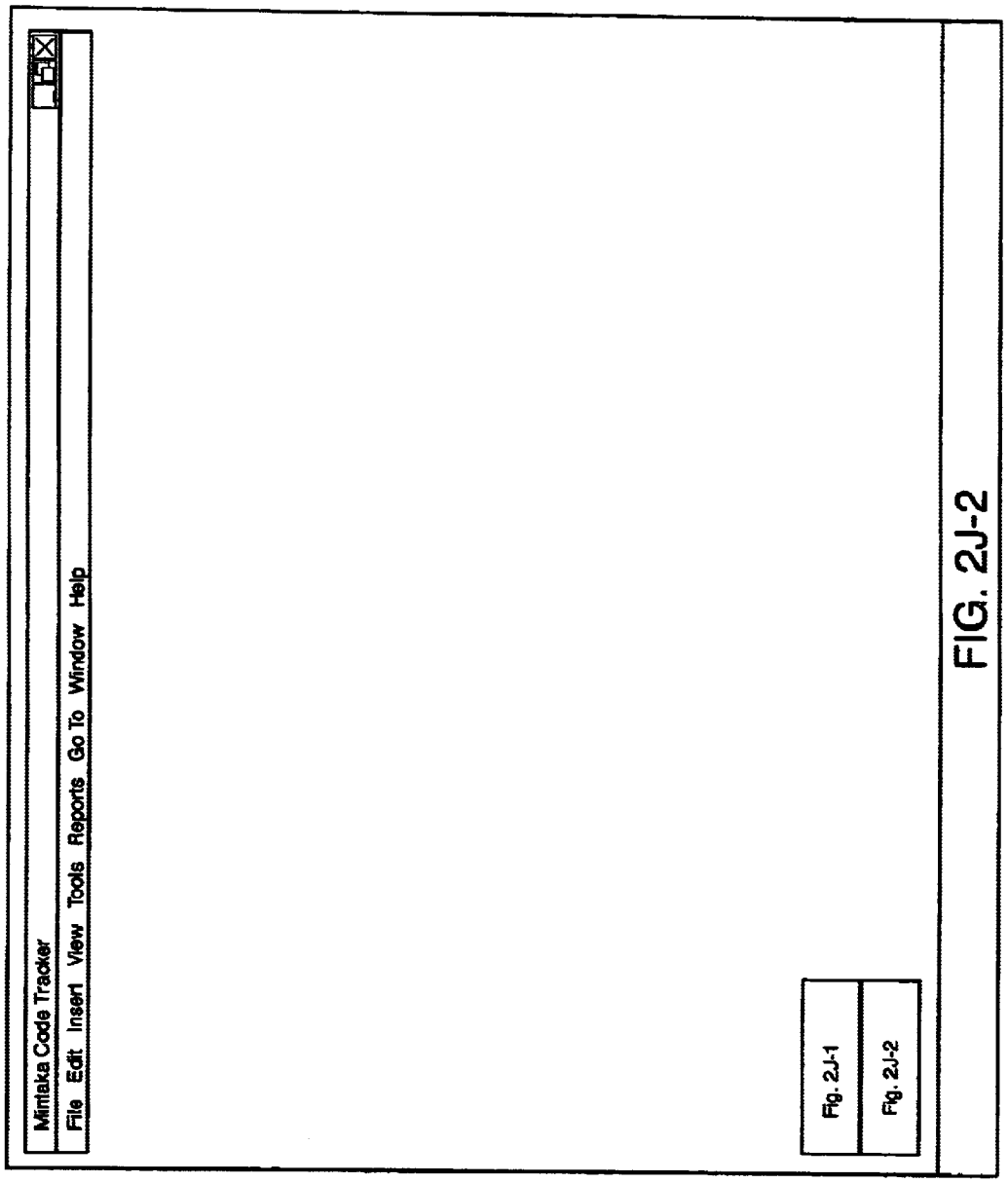
FIG. 2J illustrates an example of yet another report generated in accordance with one or more embodiments of the system, based on information recorded in the transaction log.

Other reports about different editing activities may also be generated by the system based on information stored in transaction log 160. FIG. 2J illustrates another example of a report generated by the system to provide detailed information about user activity on a code module. As shown, information included in such report includes the name of the code module edited, the time and date the module was updated, and a description of the edit activity. In certain embodiments the name of the application software associated with the code module is also included.

Color Coding Feature

Figure 2K:
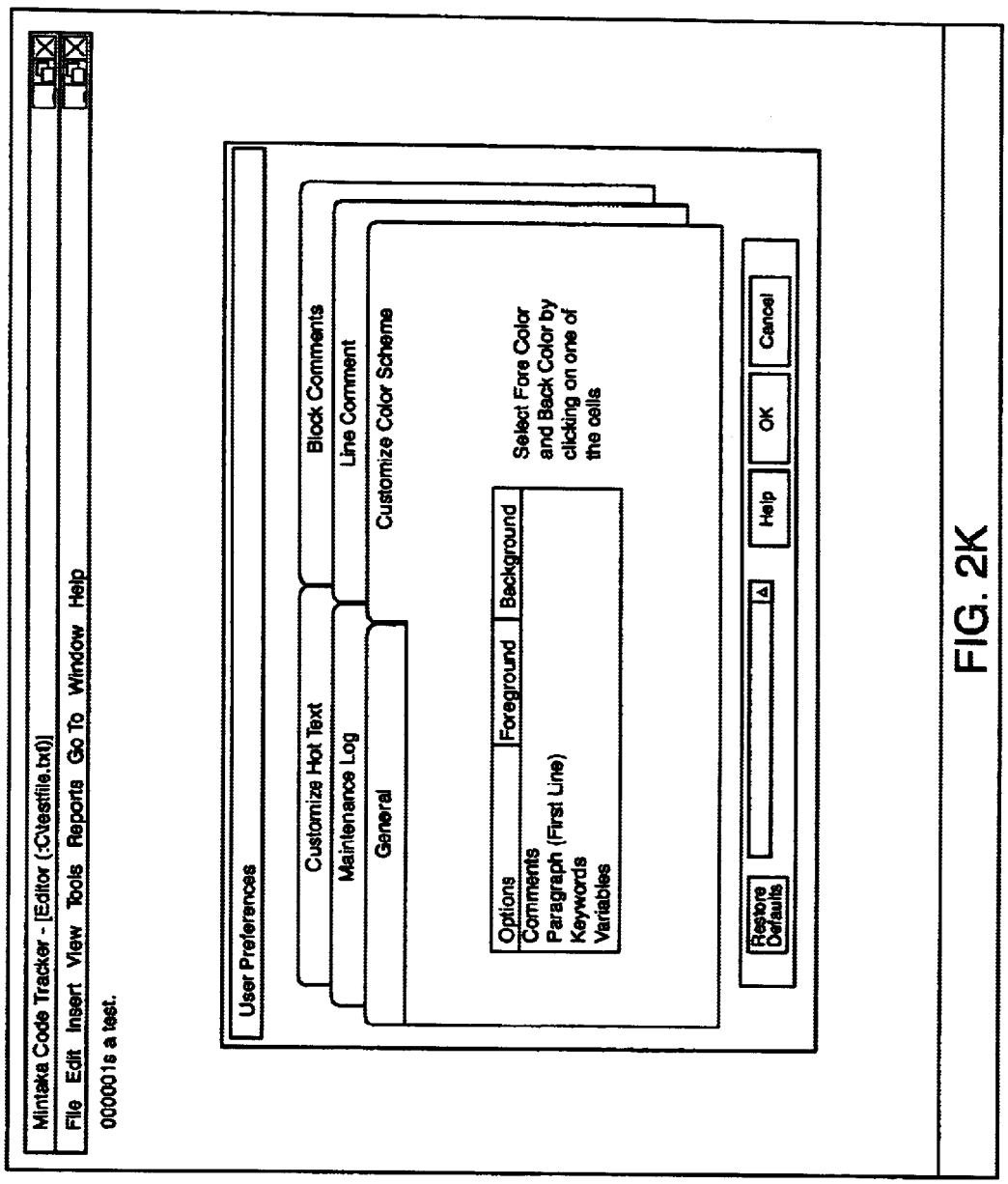
FIG. 2K illustrates an example of a feature of the system that allows a user to color-code the source code or the transaction log, in accordance with one or more aspects of the invention.

Lines of text included in transaction log 160 can be color-coded based on a search term or condition to make it easier for a user to identify certain types or related series of modifications made in the source code. In certain embodiments, source code 120 may be also color-coded for the same purpose. In one or more embodiments, a user can activate a preference menu to apply a color code or scheme to various portions of source code 120 or transaction log 160. FIG. 2K illustrates an example of a preference menu in accordance with one or more aspects of the invention implemented to allow a user to select different color coding schemes.

As shown, the user can choose from a list of options associated with different segments of source code 120 or transaction log 160. A user can, for example, choose to color code comments, keywords, or variables. Another possibility may be color coding the first line of each paragraph or paragraph heading. Further, the user may select different foreground or background colors for each option selected.

Search and Reference Features

In accordance with one or more aspects of the invention, the system includes features that allow a user to instantly search, edit, or refer to certain portions of the source code 120 or transaction log 160. As discussed in further detail below, certain features also allow a user to determine the definition of certain data or terms included in source code 120 or transaction log 160. In a computing environment, data is stored, managed, and manipulated using data structures. Data structures are defined in source code 120 in association with a variable. A declaration line in source code 120, defines a variable and data structures or values assigned to the variable.

For example, a data structure for variable "BD" may be defined as a character string that is eight characters long. Further, variable BD can be set equal to 01011960 to indicate a birth date on Jan. 1, 1960. The following is an example of the data division of a source code written in the Cobol programming language, declaring variables BD and TODAY:

| Variable | Definition | Value |
|---|---|---|
| 01 BD | PICTURE X(8) | VALUE '01011960'. |
| 01 TODAY | PICTURE X(8) | VALUE '01012000'. |

BD and TODAY in the above example are variables with assigned values of 01011960 and 01012000, respectively and are defined as eight-character long text strings (e.g., PICTURE (8)). A variable may also assume the value of another variable. For example, BD can be set equal to "TODAY" (e.g., MOVE TODAY TO BD). Typically, a variable can assume the value of another variable only if both variables are compatible in type and size. A multitude of different variables can be declared and used through out a source code.

According to one aspect of the invention, the system uses the "pop-up" window feature of the Microsoft Windows help engine, for example, to link each occurrence of a variable in source code 120 with the definition of that variable, so that when a user references (e.g., points to selects, etc.) points to that variable at any point in the source code, information about the variable (e.g., type, size, value, etc.) is displayed. Thus, for example, referencing to the term "TODAY" the above example (written in Cobol language) would display "PICTURE X (8)", or "01011960" or both. Using this feature, a programmer can quickly refresh his or her memory about the definition of a variable in the code and determine whether certain variable assignments or modifications would be proper, without having to search for the variable in the declaration section of the code.

In embodiments of the system, a line in source code 120 is linked with a corresponding line in transaction log 160 to allow fast jumps between the two. Each entry in transaction log 160 corresponds to a deleted, modified, or new line in source code 120. When a user selects a line in source code 120, the system determines if that line is associated with a link to an entry in transaction log 160. If the line has been modified then the link relates to an entry in transaction log 160 that includes modification information about the selected line in source code 120.

Thus, for example, if entry number 100 in transaction log 160 was recorded to indicate that line number 445 in source code 120 was modified in some way, then in response to referencing entry number 100 in transaction log 160, the system displays line 445 of source code 120. In turn, referencing line 445 in source code 120 will result in the system displaying entry number 100 of transaction log 160.

According to one or more aspects of the invention, the system includes features that allow a user to view information about variables dependent on a certain target variable. As explained earlier, a variable can assume the value of another variable. For example, variable A may assume the value of TODAY (e.g., MOVE TODAY TO A) and variable B may assume the value of A (e.g., MOVE A TO B). Thus, by virtue of the above assignments, value of variable B is dependent on value of A and TODAY. Further, value of A is dependent on value of TODAY.

In accordance with one aspect of the invention, a user can request the system to identify variables dependent on A, for example, by selecting A at any place in source code 120. In response to this request, the system displays B because any change in value of A will change the value of B. In accordance with another aspect of the invention, a user can request the system to identify variables that A depends upon. In response to this request, the system displays TODAY because any change in value of TODAY will change the value of A.

Yet in accordance with another aspect of the invention, the system displays both variables TODAY and B, providing the user with a list of variables that depend on A and a list of variables that A depends upon. In certain embodiment of the system, additional information about a dependent variable, such as the definition and values associated with that variable, is also displayed.

To determine the dependencies between variables defined in source code 120, the system evaluates the source code and detects variables declared in source code 120. The detected variables are then logically linked so that all relationships among different variables can be determined based on said links. In certain embodiments, the system detects type or size discrepancies among dependent variables and recommends specific data type assignments. For example, if a new declaration is made to assign the value of a first variable to a second variable (e.g., MOVE A TO B), the system determines the type and length of both variables. If the variables are compatible in size, type, and other data attributes (e.g., A and B are both declared as 6 characters long text strings) then the system does not generate any message.

However, if the variables are not compatible (e.g., A is declared as a four character long text string, and B is declared as a 6 character long text string) then the system warns the user of the conflict and suggests a solution to resolve the conflict (e.g., a message indicating that the declaration for variable A should be modified to a six character long text string). In embodiments of the invention, the system facilitates the modification of the declaration for a variable by allowing the user to enter the information in response to a system prompt, rather than going to the declaration section of the code.

Example of an Embodiment

Figure 4:
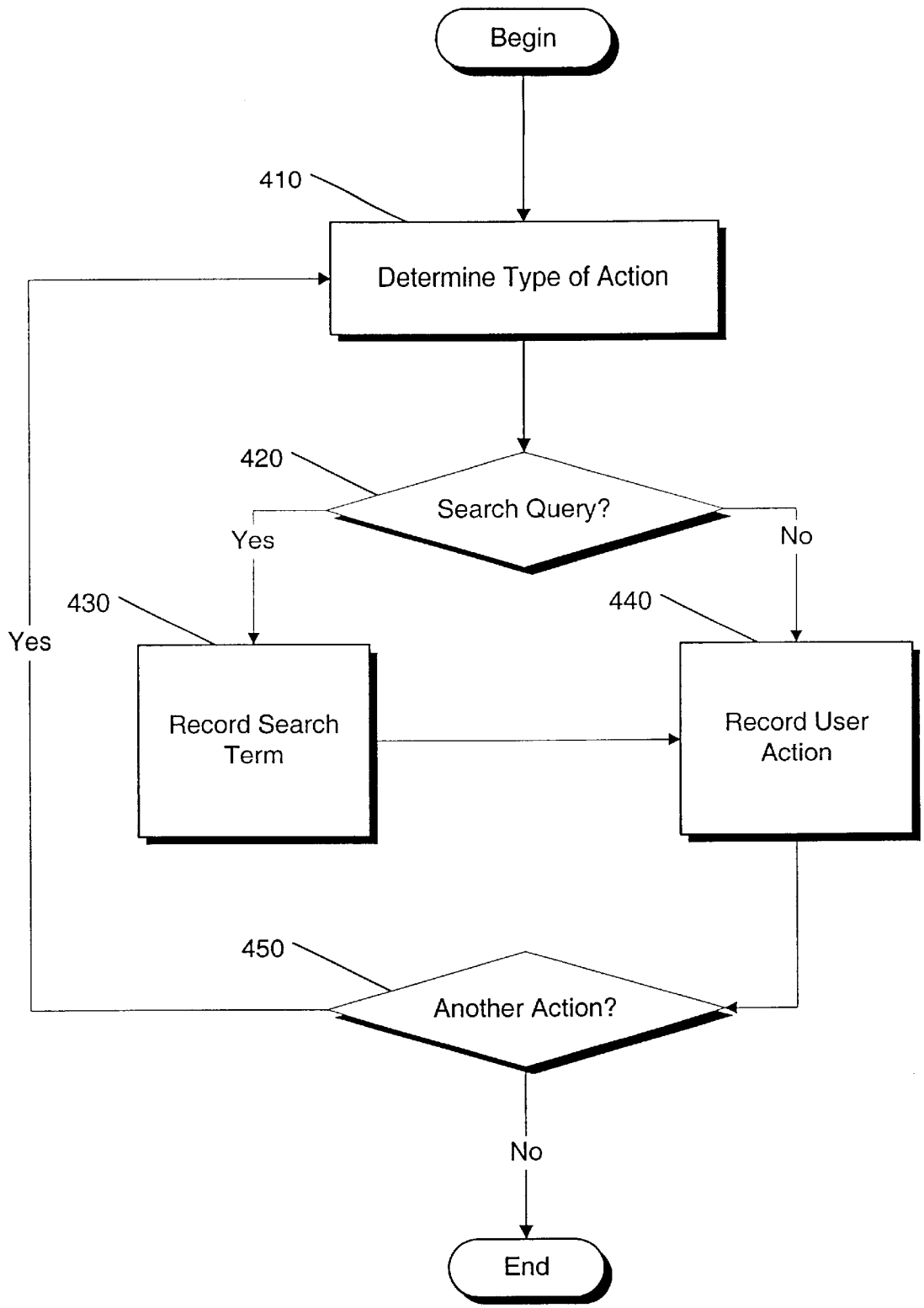
FIG. 4 is a flow diagram of a method of determining and recording various types of user actions performed during maintenance of computer readable code, according to one or more embodiments of the invention.

Further details on how user actions or events are detected and recorded are provided below, by way of example, as applicable to the formatting requirements illustrated in Table 2. FIG. 4 illustrates how system 100 analyzes and records a user action, in one or more embodiments of the invention. At step 410, system 100 determines the type of action taken by the user. For example, system 100 may determine that the action taken was to open a maintenance session. Then, at step 420, system 100 determines whether or not the action performed was a search request. A search request is an action that is performed when the user submits a search query for a specific text string.

If system 100 determines that the action performed was not a search query then system 100 continues to step 440. At step 440, if the system determines that the action is a recordable action then it records information about the type of the action in transaction log 160 by appending an entry in the form of a record illustrated in Table 1, for example. In one or more embodiments of the invention, the record includes a reference to a certain type of action (e.g., "open session"). In addition to the reference to the type of action other information is also recorded. For example, an entry recorded in transaction log 160 for an "open session" action may contain the following information:

| | |
|---|---|
| Record ID: | 100000001 |
| Type of Action: | Open Session |
| Text: | Start Session |
| Date: | 01/01/2000 |
| Time: | 00:01 A.M. |
| User ID: | JDOE |

In one or more embodiments, a unique Record ID is assigned to each entry. Information about the type of the action performed (e.g., "Open Session" action) or other types of references are included in each entry. The exact date, time, and the identity of the user are also recorded in each entry. Also included is a text field that includes clarifying or additional information about the action or event performed or the content of the line modified, for example.

In some embodiments, a text field can be 80 or 256 characters long (e.g. the length of a line of code in the source code). The comments entered allow users to refresh their memory about the reasons for each modification, at a later time. In certain embodiments, the text field contains the content of the line of focus associated with the user action. In other embodiments, the text field contains a unique identifier for identifying the context of modification, (e.g., "V2.2").

Referring back to FIG. 4, if system 100, at step 420, determines that the action performed was a search query, then in addition to recording the action in transaction log 160 it also records the search term in search table 150, at step 430. The order in which information is stored in search table 150 or transaction log 160 is immaterial in embodiments of the invention. Thus, if the action performed is a search query then in one embodiment, at step 430, system 100 records the search term in search table 150; and thereafter records the action in transaction log 160, at step 440. In certain embodiments, the system does not record or track search queries and thus does not include search table 150.

Search terms recorded in search table 150 are stored in a searchable data structure to allow a user to quickly find all terms previously searched for by another user who maintains or has previously maintained the same code, for example. One or more embodiments of the system also allow for multiple term or conditional searches to be performed on the content of transaction log 160 or source code 120. Once system 100 has recorded the appropriate information about an action in transaction log 160, at step 450, it waits to detect another action. If so, it reverts to step 410 to determine the type of action. Otherwise, system 100 continues to wait for the occurrence of another action, at step 450. The above record formats and data structures are provided by way of example only. Other implementations and data structures are possible.

To further illustrate the process of FIG. 4 consider a user logging on to system 100 to replace all occurrences of the word "DATE" in a certain module in source code 120. Also assume that the name of the code module being modified is "M2000" and the user is identified by User ID "JDOE113". Referring to FIG. 4, after the user logs in, at step 410, system 100 determines that an open session action has taken place, for example, and records an entry with the following format to transaction log 160, at step 440:

| Record ID: | 100000001 |
|---|---|
| Type of Action: | Open Session |
| Text: | Start of Session |
| Date: | 01/01/2000 |
| Time: | 00:01 A.M. |
| User ID: | JDOE113 |

A unique Record ID "100000001" is assigned to the entry, for example. Referring to Table 2, the action type recorded is an open session. The exact date and time when the action occurred are also recorded. When user JDOE113 makes a request to open module "M2000" for maintenance, system 100 detects another user action at step 450. The system then reverts to step 410 and (referring to Table 2) determines that the action is to open a module, for example. System 100 records in transaction log 160 the following record, for example:

| Record ID: | 100000002 |
|---|---|
| Type of Action: | Open Module |
| Text: | . . . / . . . /M2000 |
| Date: | 01/01/2000 |
| Time: | 00:02 A.M. |
| User ID: | JDOE113 |

After user JDOE113 has opened module M2000, he then enters a search query for the value "DATE." Going through the same process as described in FIG. 4, system 100 detects and determines the type of action performed and appends to transaction log 160 the following record, for example:

| Record ID: | 100000003 |
|---|---|
| Type of Action: | Go Find |
| Text: | "DATE" |
| Date: | 01/01/2000 |
| Time: | 00:03 A.M. |
| User ID: | JDOE113 |

Referring to Table 2, "Go Find" in the type field indicates that a search query for "DATE" has been requested. Entry 100000003 indicates that user JDOE113, at 00:03 A.M. on Jan. 1, 2000 made such search query. Once the term searched for is located, in one or more embodiments of the invention, system 100 determines information about the exact line number wherein the search term appears. For example, the first occurrence of the word "DATE" may appear on line 13 of module "M2000". Thus, once the system finds the search term, it appends the following record to transaction log 160, for example:

| Record ID: | 100000004 |
|---|---|
| Type of Action: | Text Matched |
| Text: | "MOVE DATE TO A" |
| Date: | 01/01/2000 |
| Time: | 00:04 A.M. |
| User ID: | JDOE113 |

This record includes a field indicating that a match has been found. The record also includes a field containing part or the entire line in which the matching term was found, for example. In embodiments of the invention, the system also records the line number of the line found by appending the following record to transaction log 160, for example:

| Record ID: | 100000005 |
|---|---|
| Type of Action: | Match Line No. |
| Text: | "13" |
| Date: | 01/01/2000 |
| Time: | 00:05 A.M. |
| User ID: | JDOE113 |

The above record indicates that a match for the search term has been found, on line 13. If a match is not found, system 100 instead appends a record having a type field, indicating that the end of the code was reached and no matches were found (e.g., See Table 2, "End, No Match"). Presuming that the first occurrence of the word "DATE" was found on line 13, however, let's also presume that the user deletes line 13.

To track a detailed history of all modifications made to a line of code, in embodiments of the invention, system 100 maintains a line-by-line point of focus. This means that as soon as a user moves the cursor from one line to the other, system 100 detects a change in the point of focus and records changes made to the line that was at the point of focus. To detect a change in the point of focus, the system monitors keyboard and mouse events and other types of user interaction leading to an event that indicates a change of cursor position.

For example, while editing source code 120, if the cursor is on line 13 then the point of focus is line 13. Also, for example, when a user deletes line 13, the point of focus is line 13. A change in cursor position is detected when the user presses a key (e.g., down arrow) on the keyboard or clicks the mouse on a line other than the line of focus, for example.

In other embodiments of the invention, the point of focus may change if the user moves from one word to the next or one paragraph to the next by way of utilizing the mouse, keyboard, or any other user interface device. Once the point of focus has changed, the system detects that line 13 has been removed and appends the following records to transaction log 160, for example:

| Record ID: | 100000006 |
|---|---|
| Type of Action: | Delete Text |
| Text: | "MOVE DATE TO A" |
| Date: | 01/01/2000 |
| Time: | 00:06 A.M. |
| User ID: | JDOE113 |

| | |
|---|---|
| Record ID: | 100000007 |
| Type of Action: | Delete Line No. |
| Text: | "13" |
| Date: | 01/01/2000 |
| Time: | 00:07 A.M. |
| User ID: | JDOE113 |

Content of line 13 as it was prior to deletion are recorded in a field in Record 100000006 to provide an accurate and detailed record of the content of line 13 prior to modification. In some embodiments, the system also records an entry that includes the content of line 13 after it was modified. However, since line 13 is deleted in this example, no entry is recorded. This level of detail can be useful in situations when a user tries to determine or remember the reason for certain changes made by him or a previous user. Viewing the code in conditions before and after changes are made aids both memory and understanding. Other levels of detail can be also recorded by system 100 depending on the type of action performed by the user, according to one or more embodiments of the system.

After the user has made the appropriate modification, the user then closes the module and the session. Referring to Table 2, the following records are examples of entries that system 100 will then record in transaction log 160:

| | |
|---|---|
| Record ID: | 100000008 |
| Type of Action: | Close Module |
| Text: | " . . . / . . . /M2000" |
| Date: | 01/01/2000 |
| Time: | 00:07 A.M. |
| User ID: | JDOE113 |

| | |
|---|---|
| Record ID: | 100000009 |
| Type of Action: | Close Session |
| Text: | "End Session" |
| Date: | 01/01/2000 |
| Time: | 00:08 A.M. |
| User ID: | JDOE113 |

Thus, detailed records of actions performed by a user are recorded by system 100. Using this information, the system can compile and process detailed records of a user's actions and can provide elaborate reports on the amount of time spent on maintaining each module and the nature of changes made to source code 120 over time by each user. Describing the invention as applicable to Tables 2 should not be construed as limiting the invention to the specific formatting requirements included in Table 2 or other Tables included herein.

The embodiments, data types, and data structures described above are for the purpose of example only. Other system embodiments, data types, data formats, or data structures may be used to promote and implement this invention. Furthermore, embodiments of this invention may be practiced in other computer environments, as further described below.

NETWORK ENVIRONMENT

Figure 5:
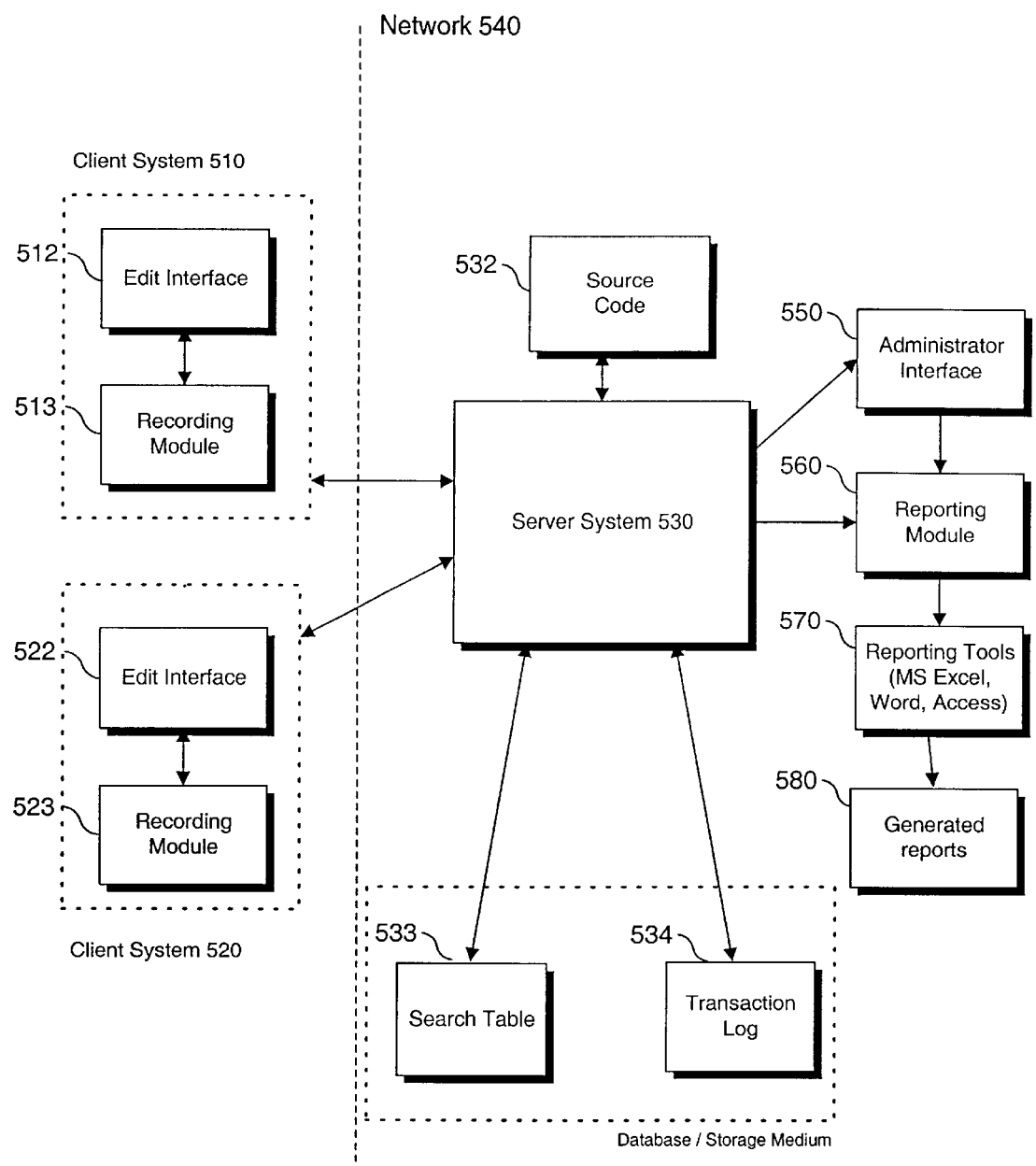
FIG. 5 illustrates a block diagram of the components of the system of this invention in a networked environment, according to one or more embodiments.

FIG. 5 is an example of one embodiment of the invention, wherein the system is implemented in a server/client environment. The system comprises client systems 510 and 520 connected to server system 530 via network 540. In this embodiment, multiple users can access information available on server system 530 via network 540 communication lines. As shown, each client system includes an edit interface and a recording module (e.g., edit interfaces 512 and 522, and recording modules 513 and 523). Server system 530 includes source code 532, search table 533, transaction log 534, administrator Interface 550, and reporting module 560. Search table 533 and transaction log 534, in certain embodiments, are implemented in one or multiple data structures.

In one or more embodiments of the invention, the recording and reporting modules in network 540 operate substantially in the same manner as the recording and reporting modules of system 100 illustrated in FIG. 1. In the networked embodiment illustrated in FIG. 5, however, requests for performance of certain actions are made using a client system (e.g., client system 510) and are then transferred via network lines to server system 530. Server system 530 detects user actions and search queries and records the actions in transaction log 534 and search table 533.

Reporting module 560 analyzes the recorded information and using reporting tools 570 generates reports 580. Administrator interface 550 allows the system administrator to perform various administrative tasks (e.g., adding or deleting users, backing up system information, etc.) on network 540. The network environment illustrated in FIG. 5 can be any type of computer network such as a local area network (LAN) or a wide area network (WAN), including the world wide web (WWW).

The manner in which the application software operates and interacts with the above-described components of the system will be better understood and appreciated after reviewing the following description of system hardware and software environments.

SYSTEM HARDWARE ENVIRONMENT

Figure 3A:
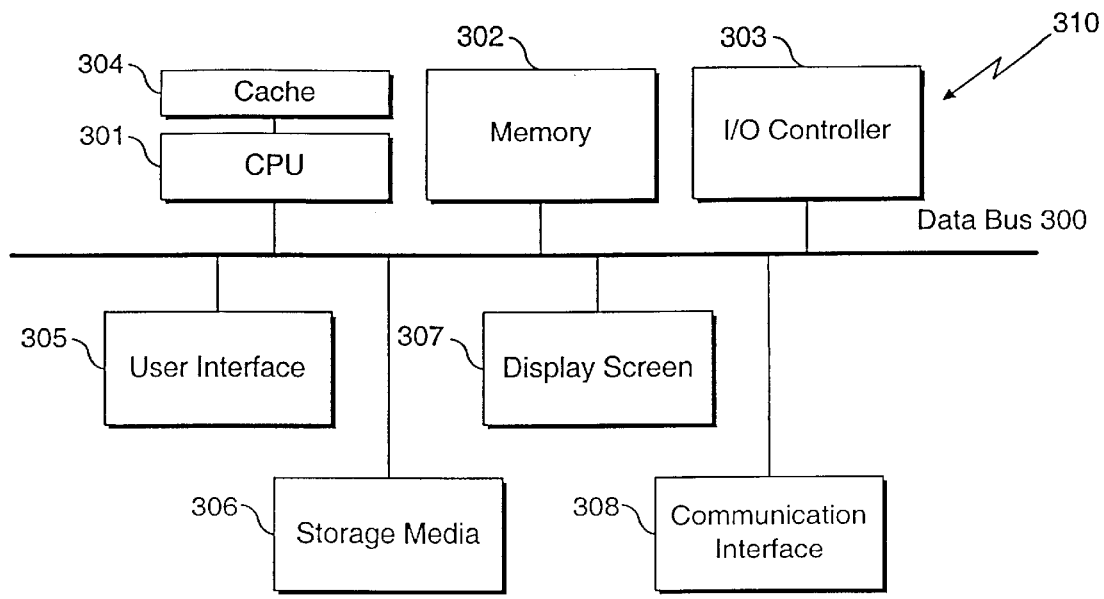
FIG. 3A is a block diagram of one embodiment of a computer system capable of providing a suitable execution environment for the system of the invention.
Figure 3B:
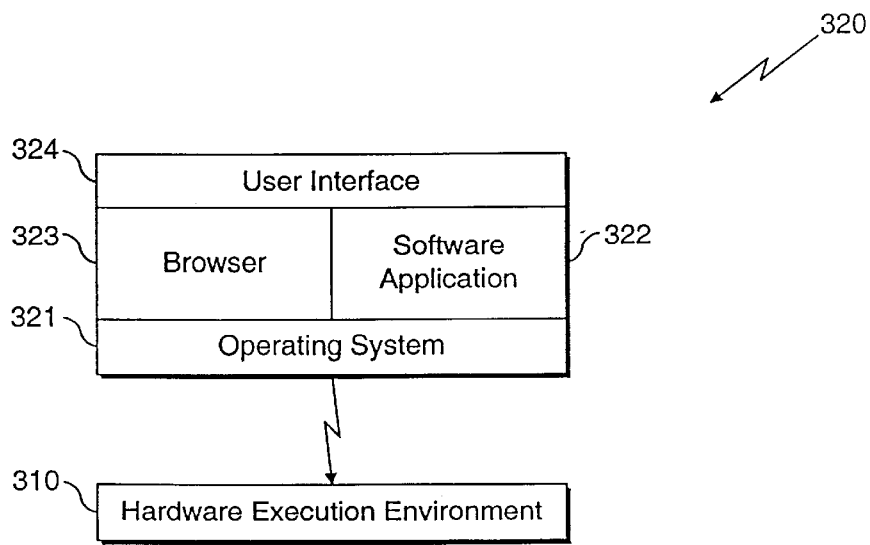
FIG. 3B is a block diagram of one embodiment of system software that directs the operation of the computer system illustrated in FIG. 3A.

The various hardware and software components of the system are illustrated in FIGS. 3A and 3B. This invention, including the application software for monitoring and reporting actions performed during maintenance of computer readable code, in one or more embodiments, can be implemented in association with hardware system 310 (FIG. 3A) and software system 320 (FIG. 3B). The disclosed hardware and software systems, however, are provided for the purpose of example only. The invention may be practiced either individually or in combination with other suitable hardware or software architectures or environments.

An embodiment of the invention that includes system and/or application software can be implemented as computer software executed on a general-purpose system such as system 310, illustrated in FIG. 3A. System 310 comprises a central processor unit (CPU) 301, main memory 302, input/output controller 303, cache memory 304, user interface devices 305 (e.g., keyboard, mouse, microphone, camera, etc.), storage media 306 (e.g., hard drive, flash memory, floppy, optical, or magneto-optical disks, etc.), display screen.307, communication interface 308 (e.g., a network card, a modem, or an integrated services digital network (ISDN) card, etc.), and system clock (not shown in FIG. 3A).

Processor 301 may or may not include cache memory 304 that is utilized for storing frequently accessed information. One or more input/output devices such as a printing or a scanning device may be included in system 310. A bi-directional system bus 300 provides a mechanism for communication between the system components. The system itself is capable of communicating with other systems through communication interface 308.

For example, system 310 can send messages and receive data, including program code through the communication interface 308. Wireless links are also possible. In any such implementation, communication interface 308 can send and receive electrical, electromagnetic, or optical signals that carry digital data streams representing various types of information. If communication is established via the Internet, a remote server system might transmit the requested code for an application program through an Internet connection to the communication interface 308. The received code is executed by central processor unit 301 as it is received or stored in storage media 306 or other non-volatile storage for later execution.

System 310 may obtain program code transmitted by a number of different ways, for example in the form of code transmitted via any type of carrier wave. Program code may be embodied in any form of computer program product. A computer program product comprises a medium configured to store or transport computer readable code, or a medium in which computer readable code may be embedded. Some examples of computer program products are CD-ROM disks, ROM cards, floppy disks, magnetic tapes, computer hard drives, servers on a network, and carrier waves.

In one or more embodiments of the invention, processor 301 is a microcomputer or a microprocessor manufactured by Motorola® or Intel® (e.g., a Pentium® processor), or a SPARC® microprocessor from Sun Microsystems, Inc., for example. The system hardware may be embodied in the form of a computer system, a portable wireless device, a set-top box, or other similar hardware that have information processing and data storage capabilities.

SYSTEM SOFTWARE ENVIRONMENT

FIG. 3B illustrates a computer software system 320 suited for managing and directing the operation of system 310, for example. System software 320 is, typically, stored in storage media 306 and is loaded into memory 302 prior to execution. It includes an operating system (OS) 321 that controls the low-level operations of system 310. Low level operations include the management of the system's resources such as memory allocation, file swapping, and other core computing tasks. In one or more embodiments of the invention, operating system 321 is Microsoft Windows 2000®, Microsoft Windows NT®, Macintosh OS®, or IBM OS/2®. However, any other suitable operating system may be utilized.

One or more computer programs, such as client software application 322, are executed on top of the operating system 321 after they are loaded from storage media 306 into memory 302. Client software application 322 may include web browser software 323 for communicating with the Internet. Software system 320 includes a user interface 324 (e.g., a Graphical User interface (GUI)) for receiving user commands and data. The commands and data received are processed by the software applications that are running on the computer system 310.

The system architectures and environments described above are provided for purpose of example only. Embodiments of the invention may be implemented in any type of system architecture or processing environment. For example, in some embodiments of the invention the system software may be hardwired into the hardware environment or implemented within non-volatile memory devices.

It should be understood that system configurations are disclosed here by way of example. Other system architectures, platforms, and implementations that can support the electronic transferring, recording, and processing of information may be utilized. Thus, a system and method for recording user actions during maintenance of software code is described, in conjunction with one or more specific embodiments. These and various other adaptations and combinations of features of the embodiments disclosed are within the scope of the invention. The invention is defined by the following claims and their full scope of equivalents.

What is claimed is:

1. In a computing system, a method for tracking user interaction with computer readable code, said method comprising:

monitoring user interaction with computer readable code;

recording information about the type of the user interaction;

if the user interaction relates to a point of focus in a first position in the computer readable code, then recording information about said first position;

if the point of focus changes from said first position to a second position in the computer readable code, then determining if the content of the point of focus in said first position has changed; and if the content of the point of focus in said first position has changed, then recording information about the content of the point of focus in said first position.

2. The method of claim 1, wherein if the user interaction relates to a point of focus in a first position, then recording an attribute defining the relationship between the user interaction and the point of focus in said first position.

3. The method of claim 1, wherein:

in association with said user interaction, if the content of the point of focus in said first position has changed then recording the content of the point of focus in said first position before the change.

4. The method of claim 1, wherein:

in association with said user interaction, if the content of the point of focus in said first position has changed then recording the content of the point of focus in said first position after the change.

5. The method of claim 1, wherein:

the user interaction comprises an action taken by the user during maintenance or development of computer readable code.

6. The method of claim 1, wherein:

the user interaction further comprises an event resulting from an action taken by the user during maintenance or development of computer readable code.

7. The method of claim 6 further comprising:

recording a term, if the user interaction includes a request to search for the term in the computer readable code.

8. The method of claim 1, further comprising:

recording information about the identity of a user interacting with the system.

9. The method of claim 1, further comprising:

recording a date indicating when the user interaction was recorded.

10. The method of claim 1, further comprising:

recording a time indicating when the user interaction started.

11. The method of claim 1, further comprising:
recording a time indicating when the user interaction ended.

12. The method of claim 1, further comprising:
recording information associated with the computer readable code's present and past storage locations.

13. The method of claim 1, further comprising:
recording one or more names associated with the computer readable code.

14. The method of claim 1, further comprising:
recording identifying information for a project or software application associated with the computer readable code.

15. The method of claim 1, further comprising:
recording the duration of user interaction with computer readable code.

16. The method of claim 1, further comprising:
commenting the computer readable code by interacting with a preference menu; said preference menu including one or more selectable index information to comment the computer readable code.

17. The method of claim 16, further comprising:
selecting one or more of said selectable index information from the preference menu; and
automatically commenting a line in the computer readable code with the selected index information, if the line is modified.

18. The method of claim 17, wherein the index information is included in a specific portion of the line in the computer readable code, said portion reserved for the entry of comments.

19. The method of claim 17, where the index information is preceded by one or more special characters that separate the index information from the executable portion of the line.

20. The method of claim 16, wherein the step of commenting the computer readable code comprises:
selecting one or more lines in the computer readable code;
if one or more of said selectable index information are selected, then commenting said selected one or more lines in the computer readable code with one or more selected index information.

21. The method of claim 20, further comprising:
said preference menu further including a region reserved for entry of comments;
if comments are entered in said region, then commenting said selected one or more lines in the computer readable code with said comments.

22. The method of claim 16, wherein said preference menu further includes a region reserved for entry of comments; the step of user commenting the computer readable code further comprising:
in response to entering user comments in said region, causing the system to automatically include said user comments in a comment block in computer readable code, said comment block reserved for entry of comments.

23. The method of claim 1, further comprising:
commenting the computer readable code by interacting with a setup menu that is automatically activated when the user opens a code module containing computer readable code, said setup menu comprising data entry regions available to a user for entry of comments.

24. The method of claim 1, wherein the point of focus is a line.

25. The method of claim 1, wherein the point of focus is a word.

26. The method of claim 1, wherein the point of focus is a character.

27. The method of claim 1, wherein the point of focus is a paragraph.

28. In a computing system, a method for monitoring user interaction with computer readable code, said method comprising:
detecting user interaction with computer readable code;
if the user interaction with the computer readable code results in a recordable user action or event, recording one or more entries in a transaction log; an entry in the transaction log comprising:
if the user interaction relates to a point of focus:
position of the point of focus in the computer readable code;
change in the content of the point of focus; if the point of focus changes as the result of said user interaction; and
an attribute describing the relationship between the user interaction and the point of focus;
name of code module containing the computer readable code;
date when the user interaction occurred;
time when the user interaction occurred;
description of the user interaction; and
an indicator of the editing context in which the user action or event occurred.

29. The method of claim 28 further comprising:
commenting the computer readable code by interacting with a preference menu; said preference menu including one or more selectable index information; said index information comprising:
user comments;
name of code module containing the computer readable code
name of the project associated with the code module;
date of entry of comment;
time of entry of comment; and
an identifying term describing the context in which the comment is entered.

30. The method of claim 28, further comprising:
causing the system to automatically color one or more terms in the computer readable code based on type of information said one or more terms are associated with.

31. The method of claim 28, further comprising:
causing the system to automatically color one or more entries in the transaction log based on one or more terms included in that entry.

32. The method of claim 28, further comprising:
aggregating said one or more recorded entries in the transaction log;
generating a report based on the information included in said one or more entries.

33. A computer program product comprising:
a computer usable medium having executable program code embodied therein configured to monitor user interaction with computer readable code, said computer program product comprising:
executable program code configured to cause a system to determine a point of focus in a position in a line of code in computer readable code;
executable program code configured to cause the system to record information about one or more modifications to the line of code in a transaction log when the point of focus shifts to a different position.

34. The computer program product of claim 33, wherein the executable program code is further configured to cause the system to further record information about whether a modification in a line of code is made for the purpose of maintaining the code.

35. The computer program product of claim 33, wherein the executable program code is further configured to cause the system to further record information about whether a modification in a line of code is made for the purpose of further developing the code.

36. A method for tracking user interaction with a computing system, said method comprising:

monitoring user interaction with a computing system;

if the user interaction results in a recordable user action, then recording information about the type of the user action in a transaction log as a record;

if the user interaction results in a recordable event, then recording information about the type of the event in a transaction log as a record;

organizing and displaying one or more records in the transaction log in a form comprehensible by a human operator;

wherein each record in the transaction log includes in addition to information about the type of the user action or event, time of recordation, and identity of the user interacting with the computing system.

37. The method of claim 36, wherein the computing system includes a display screen and a user interaction is detected based on a change in one or more points on the display screen, wherein said one or more points are associated with a recordable user action or event.

* * * * *